United States Patent [19]

Ohnishi et al.

[11] Patent Number: 5,804,924

[45] Date of Patent: Sep. 8, 1998

[54] DISCHARGE LAMP WITH TWO VOLTAGE LEVELS

[75] Inventors: Masahito Ohnishi; Tadao Uetsuki; Takashi Kanda, all of Osaka; Masahiro Naruo, Kadoma, all of Japan

[73] Assignee: Matsushita Electric Works, Ltd., Osaka, Japan

[21] Appl. No.: 683,957

[22] Filed: Jul. 19, 1996

[30] Foreign Application Priority Data

Jul. 26, 1995 [JP] Japan .................................. 7-190895

[51] Int. Cl.$^6$ .................................................. H05B 37/00
[52] U.S. Cl. .......................... 315/160; 315/163; 315/291; 315/323; 315/307; 315/209 R
[58] Field of Search .................... 315/160, 163, 315/94, 174, 323, 291, 269, 209 R, 307, DIG. 7; 363/132, 37

[56] References Cited

U.S. PATENT DOCUMENTS

| | | | |
|---|---|---|---|
| 4,394,603 | 7/1983 | Widmayer | 315/311 |
| 4,564,897 | 1/1986 | Okamato et al. | 363/132 |
| 5,502,423 | 3/1996 | Okude et al. | 315/291 |

FOREIGN PATENT DOCUMENTS

| | | |
|---|---|---|
| 48-23274 | 3/1973 | Japan . |
| 59-16400 | 12/1975 | Japan . |

*Primary Examiner*—Benny Lee
*Assistant Examiner*—Haissa Philogene
*Attorney, Agent, or Firm*—Burns, Doane, Swecker & Mathis, L.L.P.

[57] ABSTRACT

A discharge lamp lighting device includes first voltage source of a high voltage capable of increasing lamp current, the voltage value of which being sequentially variable, and second voltage source of a low voltage capable of decreasing the lamp current, the voltage value of which being sequentially variable, lighting connection of the first and second voltages sources to a discharge lamp being alternately changed over for its stable lighting, whereby the stable lighting of the lamp can be made with any current limiting element minimized and a response to variation in outputs over a wide range as well as any radiant noise can be effectively improved.

23 Claims, 20 Drawing Sheets

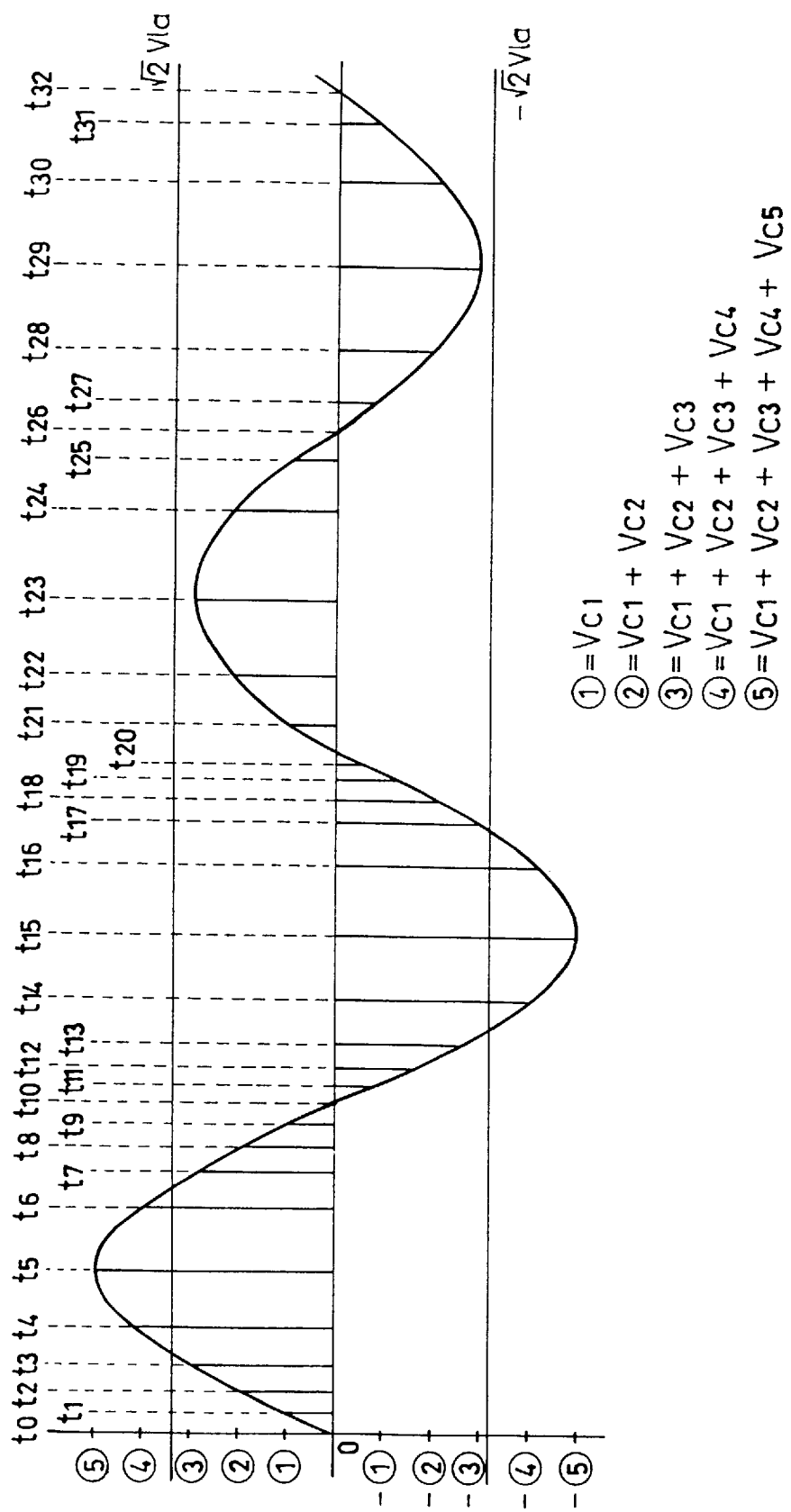

LAMP VOLTAGE

CHARGING
DURATION

OUTPUT DURATION
OF LOW VOLTAGE

OUTPUT DURATION
OF LOW VOLTAGE

DISCHARGE LAMP WITH TWO VOLTAGE LEVELS

BACKGROUND OF THE INVENTION

This invention relates to a discharge lamp lighting device for stably lighting a discharge lamp with any current limiting element minimized.

DESCRIPTION OF RELATED ART

A known discharge lamp lighting device of the kind referred to has been disclosed in U.S. Pat. No. 4,564,897 to Okamoto et al, assigned to the assignee of the present invention, in which a large current limiting element is employed for stable lighting of the discharge lamp. This device is satisfactory in the respect that the stable discharge lamp lighting can be attained. However, a large size inductance has been required for achieving effective current limiting in Okamoto et al, and there has been left a problem that the device has been rather large in size.

In lighting discharge lamps in general, therefore, a ballast (current limiting element) is required, for reason that the lamp is of a negative characteristic in its electric characteristics, that is, it has a negative resistance. The lamp current E and the current density J are generally in such relationship as represented by a following formula:

$$J = \sigma E$$

in which σ is regarded as the conductivity, which can be deemed to be a constant in the case of solid matter, whereas the conductivity will be a function of electron density as denoted by a following formula in the case of gaseous discharge:

$$\sigma = e n \mu$$

in which e is a unit charge, n is an electron density, and μ is a mobility, and this mobility μ is a function of electron temperature and pressure but may be deemed constant.

It is found from the above that the current density, that is, (the discharge current) is determined by the electron density and electric field of the interior of the discharge lamp. Basically, it will be the most clear view that, as the lamp current or current density is determined, the electron density and electric field are eventually determined, and actually this is the case. In general, the electron density increases when the current is increased, while the electric field shows a slight change but not such a remarkable change as in the electron density. When the lamp is lighted with a power source not provided with any current limiting element, the electron density is caused to increase, and eventually the current increases. As a result, an overcurrent is caused to flow so as to entail in various troubles. The electron density is caused to increase due to an increasing time constant that is larger than a decreasing time constant and, in order to avoid this, the electric field to be applied must be varied so as to vary an energy given to electrons.

When the lamp in stably lighting state is connected to a source of high voltage, the current starts increasing, and the voltage is to be lowered. In this case, the voltage is required to be lowered below the steady-state voltage of lamp. The current then starts decreasing and the voltage is raised next. In this case, the voltage has to be raised above the steady-state voltage of lamp. Then, the current starts increasing again, and the voltage is to be lowered again, the lowering being required to be down below the steady-state voltage of lamp. Thus the operation is repeated with these steps. By varying the voltage in this way to be above and below the steady-state voltage line of the lamp, it is possible to have the lamp stably lighted. In practice, the time for which the current increases or decreases is about several μsec to several ten μsec or in the order of from several decimal msec to several msec.

Another discharge lamp lighting device suggested for lighting the discharge lamp without requiring the foregoing current limiting element has been suggested in Japanese Patent Publication No. 59-16400 of Kobayashi, laid open on Dec. 10, 1975 and entitled "Discharge Lamp Lighting Device" in which case a set of switches inserted between the lamp and two AC power sources of respectively higher and lower voltages than a steady-state voltage of the lamp are changed over at a high speed in their ON and OFF state so that only one of them will be in ON state, and the two AC power sources will be alternately used for lighting the lamp with the lamp current controlled to be in a set range, while minimizing the current limiting element. With the higher voltage than the steady-state voltages of lamp supplied, the lamp current is increased, whereas the lower voltage supply renders the lamp current decreased, and the lamp current can be controlled by properly controlling the change-over of the set of switches.

Another discharge lamp lighting device has been disclosed in Japanese Patent Laid-Open Publication No. 48-23274 of Nomura et., laid open on Mar. 26, 1973 and entitled "Discharge Lamp Lighting Device", in which device two AC power sources AC1 and AC2 are provided, a voltage lower than the steady-state voltage of lamp is constantly supplied through an inductor L to the lamp LP, an AC voltage is supplied through a capacitor C as superposed on the lower voltage to have a voltage higher than the steady-state voltage of lamp supplied, and the lighting is stabilized by modulating the amplitude of such voltage supply.

In either case of these known devices, the two sources of the voltages above and below the steady-state voltage of lamp are provided for the alternate connection to the lamp, so that the substantial current limiting element will be minimized or may even be eliminated to be generally satisfactory.

SUMMARY OF THE INVENTION

In two foregoing known devices, there still exists such a problem that radiant noise from the lamp is high due to a distortion in waveform of the lamp current.

The present invention has a main object of eliminating these problems, so that the radiant noise can be effectively restrained and a stable discharge lamp lighting can be realized.

According to the present invention, the above object can be realized by a discharge lamp lighting device in which two voltage sources including one of a higher voltage than the steady-state voltage of a discharge lamp and the other of a lower voltage than the steady-state voltage of the lamp are connected as changed over in a time division, the voltage value of the respective voltage sources is made variable, and the amplitude is modulated in accordance with the state of load.

BRIEF DESCRIPTION OF THE DRAWINGS

FIG. 5 is an operational waveform diagram of Embodiment 4 of the present invention;

Figure 1:
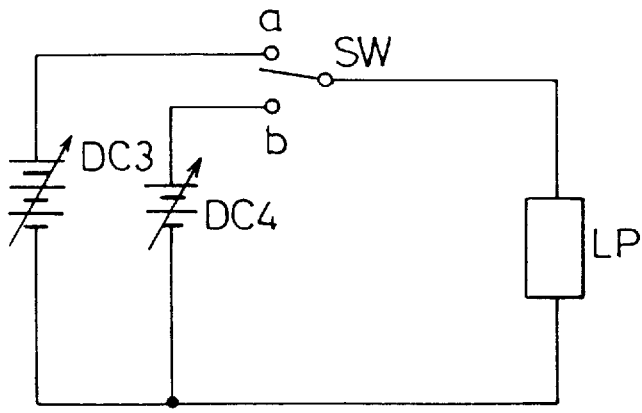
FIG. 1 is a circuit diagram of Embodiment 1 according to the present invention.

While the present invention shall be described in the followings with reference to the preferred embodiments shown in the drawings, it should be appreciated that the intention is not to limit the invention only to these embodiments but rather to include all alterations, modifications and equivalent arrangements possible within the scope of appended claims.

DETAILED DESCRIPTION OF THE PREFERRED EMBODIMENTS

A circuit diagram of Embodiment 1 of the present invention is shown in FIG. 1, in which embodiment the voltage values of both voltage sources DC3 and DC4 are arranged to be variable, while the source DC3 is of an effective voltage value higher than the steady-state voltage of the lamp and the source DC4 is of an effective voltage value lower than the steady-state voltage of the lamp. With these voltage sources DC3 and DC4 employed so that the lamp current is increased when the voltage source DC3 is connected but the source is changed over with a switch means SW when a set value of the current is reached, the lamp current is decreased when the voltage source DC4 is connected, the source is changed over by the switch means SW when the set value is reached, whereby a set current is made possible to be supplied to the lamp LP by setting the connecting time of the source to the lamp, and the increase and decrease of the lamp current can be controlled by the switch means SW for limiting the increase and decrease of the lamp current to be in a set range. In the case when the current to the lamp is increased, not only a ratio of the connecting time (the number of cycle) of the higher voltage source is varied to increase, but also the source voltage is lowered as the ratio increases. It may be possible to also vary the lower voltage source to lower the voltage. In the event when the current to the lamp is decreased, on the other hand, not only the ratio of the connecting time of the higher voltage source is varied to decrease, but also the source voltage is raised as the ratio decreases. It may be possible to also vary the lower voltage source to increase the voltage.

In this way, by varying the voltages of both voltage sources and alternately connecting them, it is possible to respond to the variation in the output over a wide range while reducing any stress onto the lamp, and also to minimize the current limiting element. Here, the range in which the voltage sources DC3 and DC4 are varied may be made to be from the largest value on positive side to the largest value on negative side, so as to supply an alternating current to the lamp.

Figure 2:
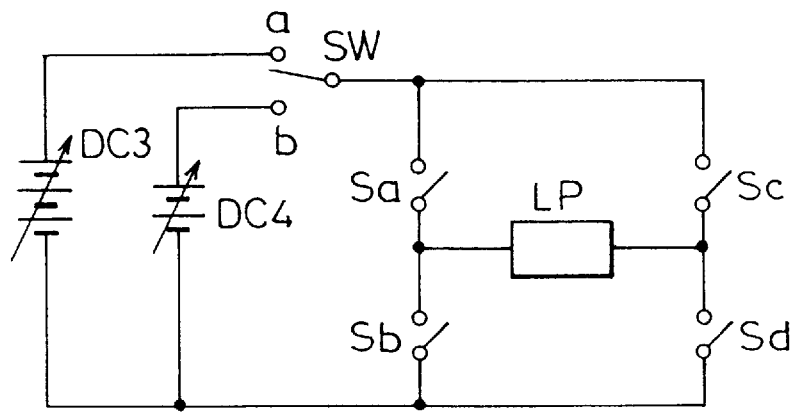
FIGS. 2–4 are circuit diagrams of Embodiments 2–4 of the present invention.

A circuit diagram of Embodiment 2 of the present invention is shown in FIG. 2, in which the voltage values of the voltage sources are made variable on one polarity side, while the aspect of variation is the same as that in Embodiment 1 of FIG. 1, and the polarity is inverted by means of polarity inverting switches Sa–Sd, so that the alternating current will be supplied to the lamp LP. In this case, too, by means of the voltage values of the voltage sources DC3 and DC4 made variable, it is enabled to minimize the differential voltage with respect to the source voltage accompanying the decrement in the steady-state voltage of the lamp upon increments in the lamp current, for example, and to minimize the current limiting element while reducing the stress to the lamp.

Figure 3:
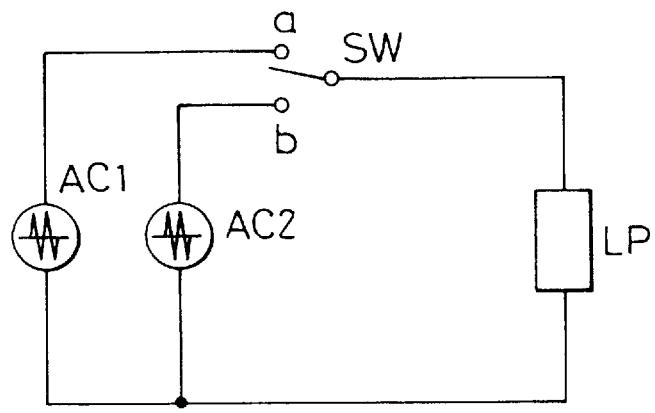

A circuit diagram of Embodiment 3 of the present invention is shown in FIG. 3, in which AC power sources AC1 and AC2 of variable voltage are employed as the voltage sources, including higher voltage source AC1 and lower voltage source AC2 than the steady-state voltage of the lamp in the effective AC voltage value. Behavior of variation in the effective voltage value is the same as in Embodiment 1 of FIG. 1, the voltage sources of two different ranges are alternately changed over in the connection to the lamp, and an AC current is supplied to the lamp.

In this case, too, by varying the voltage values of both voltage sources, it is enabled to minimize the differential voltage with respect to the source voltage accompanying the decrement in the lamp steady-state voltage upon increments in the lamp current, for example, and to minimize the current limiting element while reducing the stress to the lamp. When the voltage sources are made to be of a high frequency, further, it is made possible to further minimize the device in size.

Figure 4:
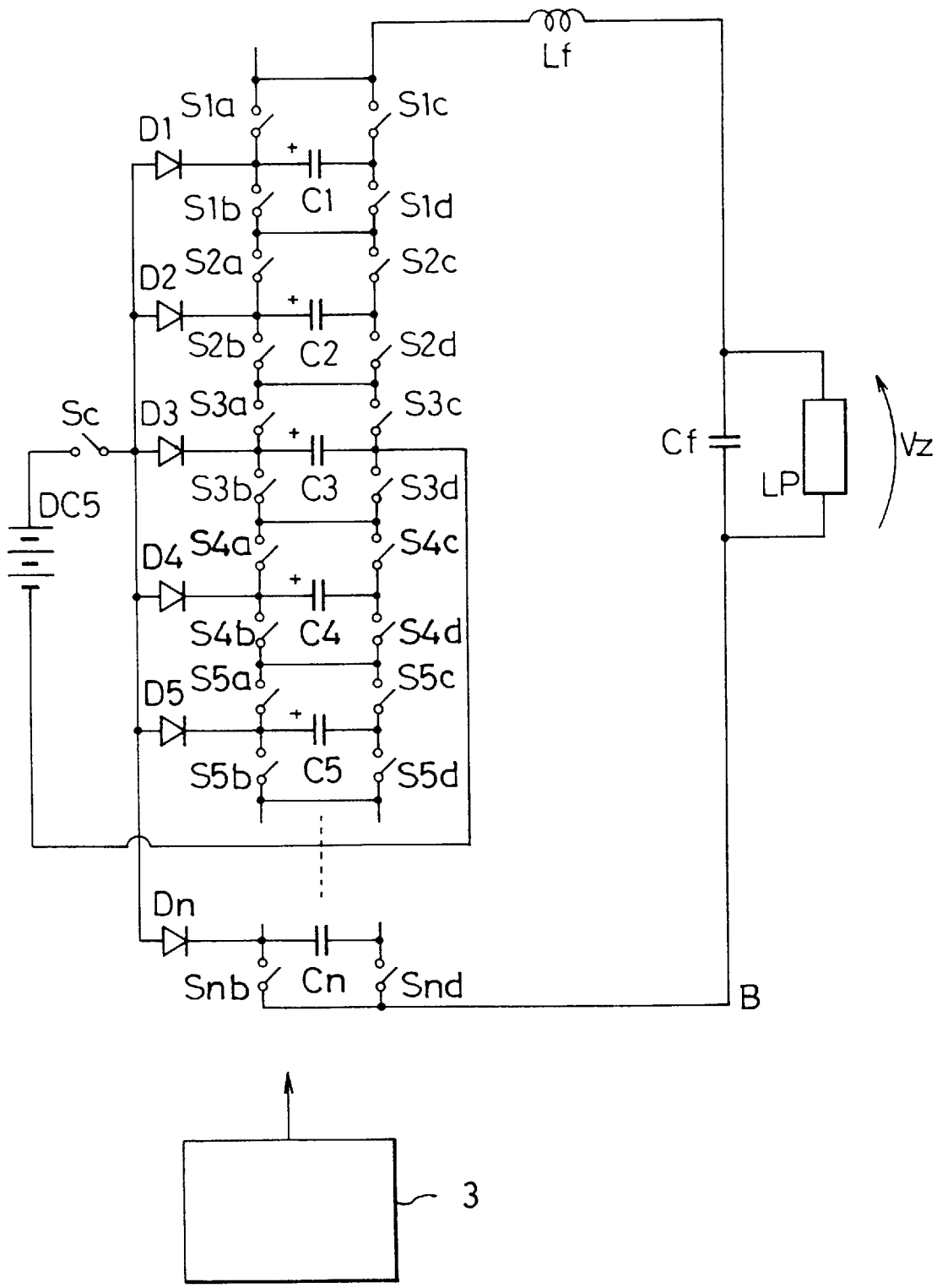

A circuit diagram of Embodiment 4 of the present invention is shown in FIG. 4, and its operational waveform is shown in FIG. 5. The present embodiment has a basic structure in which a plurality of voltage sources arranged in units are made connectable to the lamp as a load by freely connecting in series the sources with a control means, and are enabled to supply a current of sinusoidal waveform to the lamp LP by combining the sources with a filter circuit of an inductor Lf and a capacitor Cf. For the voltage sources, capacitors C1–Cn are employed, and the number of these capacitors connected in series is varied in accordance with a required voltage. The respective capacitors C1–Cn are charged in a period in which they are not discharged.

Each unit of the plurality of the voltage sources comprises each of capacitors C1–Cn and each of bridge circuits of switch means S1a–Snd surrounding each capacitor. For example, the capacitor C1 is combined with a bridge circuit of the switch means S1a–S1d to form one unit, the operation of which unit is such that, when positive pole of the capacitor C1 is intended to be connected to the inductor Lf and its negative pole to a point B connected to one end side of the units of the voltage sources, the switch means S1a and S1d, S2c and S2d, S3c and S3d, . . . Snc and Snd are made ON, with others turned OFF. In order to connect all capacitors in series, respective switch means having saffixes a and d are all turned ON in the respective units, with others turned OFF. When it is intended to supply to the lamp a voltage of inverse polarity to the above, the respective switch means of suffixes b and c are all turned ON with others made OFF in the respective units. In this way, the number of the voltage sources connected in series can be varied, and it is enabled to supply to the lamp LP a smooth AC current by means of the filter circuit of small inductor L4 and capacitor Cf.

Referring to a case where the capacitors are five, with reference to the operational waveform of FIG. 5, the lamp voltage Vz crosses zero level at time t0 and turns ON the switch means S1a and S1d, S2c and S2d, S3c and S3d, . . . Snc and Snd until time t1, with others turned OFF. When the capacitor C1 is connected to the filter circuit in this way, the current is caused to gradually increase. The switch means S1a and S1d, S2a and S2d, S3c and S3d, . . . Snc and Snd are kept ON until next time t2, with others made OFF. In this way, the capacitors C1 and C2 are connected to the filter circuit, the current gradually increases. Up to time t3, further, the switch means S1a and S1d, S2a and S2d, S3a and S3d, . . . Snc and Snd are ON with others OFF. The capacitors C1 to C3 are thereby connected to the filter circuit, and the current gradually increases. Similarly, the number of the capacitors connected is increased sequentially up to time t4 and to time t5, with respective periods between adjacent ones of the respective time points properly set, it is possible to raise the voltage waveform substantially in sinusoidal shape. For further periods through time t5 to time t10, the number of the capacitors connected is sequentially decreased, and the voltage waveform similarly descends substantially in the sinusoidal shape.

After time t10, the capacitors are connected in inverse polarity, and the waveform on negative side is similarly formed. For example, the switch means S1b and S1c, S2c and S2d, S3c and S3d, . . . Snc and Snd are made ON until time t11, with others made OFF. In this manner, the capacitor C1 is connected to the filter circuit in inverse polarity to the foregoing, the current is then gradually increased in the negative direction, and the waveform is formed in the same manner as in the case of the positive direction.

After time t20, the waveform on the positive side is formed, while a case of three capacitors connected in series is shown here. The connection of the capacitors and the operation of the filter are the same as those in the case of five capacitors, and, in this case, a voltage of a low peak value in enabled to be supplied.

In this way, the number of the capacitors, that is, the voltage sources connected through the control with a control means 3 of respective switch means can be varied and, when the lamp current detected shows to have exceeded the set value, for example, the current is made controllable in stabilizing direction by decreasing the amplitude or the connecting cycle of the sources of the voltage above the lamp steady-state voltage or by decreasing the amplitude or increasing the connecting cycle of the source voltage below the lamp steady-state voltage. Further, when the operating frequency is raised to increase the ratio of the control by means of the number of the connecting cycle, the operation will be in the direction of allowing the control to be made in a state where the difference between the two voltage sources is small, and the control in the direction of prolonging life of the lamp is made possible.

While in the DC lighting the electron density and electron temperature do not show any time variation to be constant, the elevation of the frequency of the sinusoidal voltage to be a high frequency (to be sinusoidal waveform of more than several kHz) almost does not vary the electron density but causes the electron temperature to sufficiently follow. Any runaway of current occurring at the voltage source upon lighting the lamp is caused by the increase in the electron density, and a controlling measure does not vary basically from the case of direct current. While the electron density does not vary with time, the electron temperature varies with time, and there exist incremental and decremental time constants respectively with reference to respective momentary values of the current. Both time constants will be larger where the current is large but will be smaller where the current is small, but it is considered that they are substantially of equal order to that of the direct current even at the high frequency, from the view point of the control time.

In FIG. 5, voltage levels Vla denote the effective value of the lamp steady-state voltage, and sinusoidal voltages exceeding and below the steady-state voltage can be supplied by properly changing over the number of stages of the capacitors connected in series through the control of switch means. By setting the point of changing-over at the zero-cross point, it is enabled to attain the control of the lamp current waveform kept in the sinusoidal shape and above and below the steady-state voltage, without any extreme distortion in the waveform, and to light the discharge lamp with any radiant noise further reduced while minimizing to the utmost extent the substantial current limiting element.

Figure 6A:
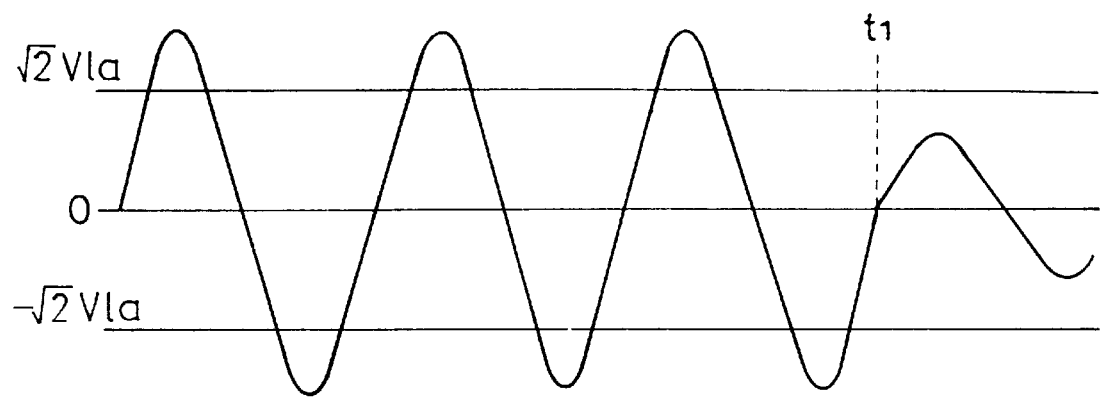
FIGS. 6A and 6B are operational waveform diagrams of Embodiment 5 of the present invention.
Figure 6B:
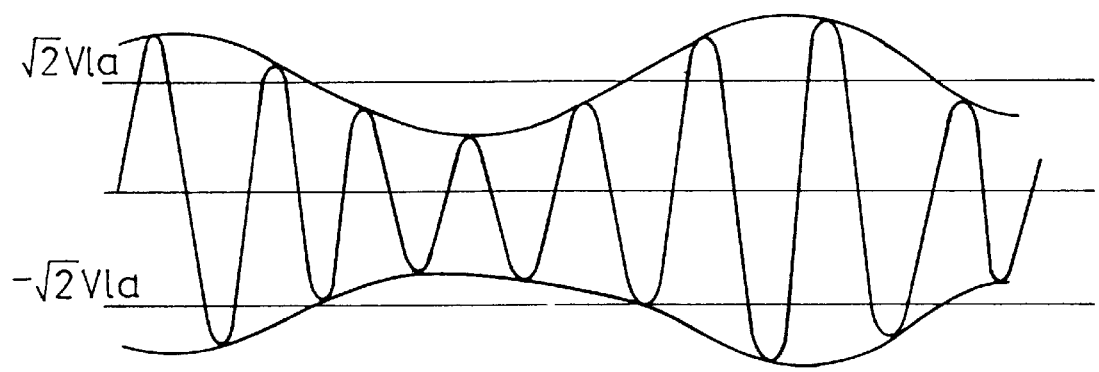

Operational waveform diagrams of Embodiment 5 according to the present invention are shown in FIGS. 6A and 6B. This embodiment is of the same circuit arrangement as in FIG. 4, and there are shown the cases where a plurality of the number of voltage cycles in sinusoidal waveform exceeding the lamp steady-state voltage Vla are taken. When the number of cycles of the sinusoidal voltage exceeding the lamp steady-state voltage increases sequentially, the lamp current increases in the effective value. The higher the frequency set for the supplied voltage as compared with the time constant of the lamp current increase, the easier the lamp current control by means of the number of the cycles.

In FIG. 6A, the voltage supply is switched at time t1 to that of the sinusoidal voltage supply below the steady-state voltage of lamp, thereafter a voltage exceeding again the lamp steady-state voltage is supplied and, with such supply repeated, it is made possible to stably control the lamp current. In this case, too, the setting of the change over point at such zero-cross point as time t1 allows the lamp current waveform to be controllable above and below the steady-state voltage as kept in the sinusoidal waveform, without any extreme distortion in the waveform.

In FIG. 6B, the control is so made that the peak value of the waveform varies smoothly in sinusoidal shape so as to be above and below the lamp steady-state voltage, without being caused to abruptly vary at time t1, whereby the discharge lamp lighting is enabled with any radiant noise lowered while minimizing substantial current limiting element to the utmost extent.

Figure 7:
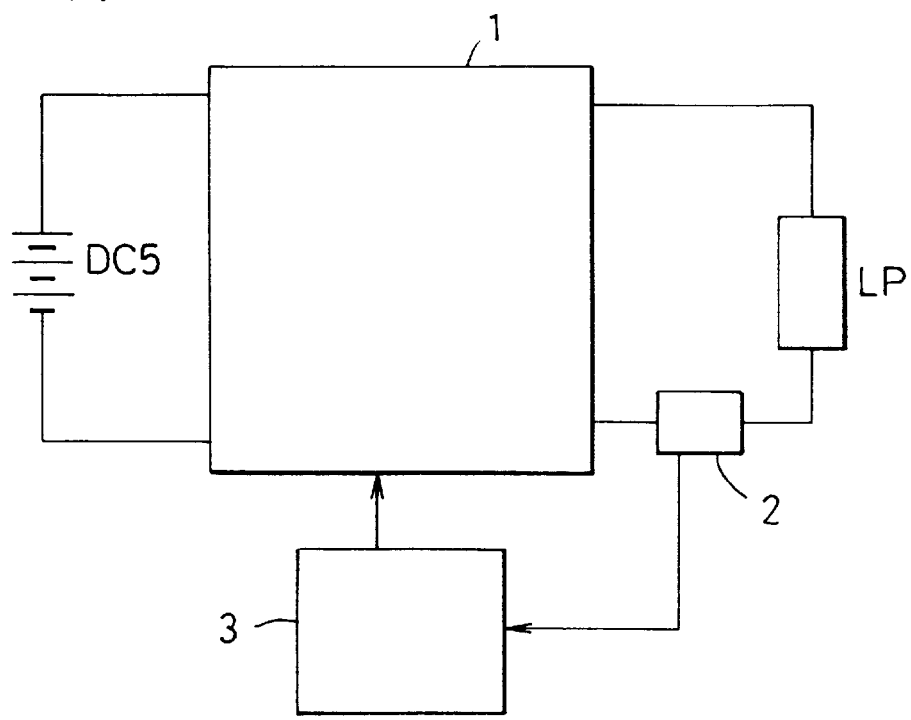
FIG. 7 is a circuit diagram of Embodiment 6 of the present invention.

A block circuit diagram of Embodiment 6 of the present invention is shown in FIG. 7, a basic arrangement of which comprises an addition of a lamp current detecting means 2 to the circuit of FIG. 4. When, for example, the increment and decrement of the lamp current is detected and the lamp current increases beyond the set value, the control is so made that the number of the capacitors in the series connection is reduced, the number of the connecting cycles of the higher voltage source than the steady-state voltage is reduced, or the number of the connecting cycle of the lower voltage source than the steady-state voltage is increased. Inversely, when the lamp current decreases beyond the set value, the control is so made that the number of the capacitors in the series connection is increased, the number of the connecting cycles of the higher voltage source than the steady-state voltage is increased, or the number of the connecting cycles of the lower voltage source than the steady-state voltage is decreased. For a converting section and the control means 3, they are the same as those in the circuit of FIG. 4.

With the use of the detecting means in this way, it is made possible to supply the optimum sinusoidal voltage exceeding the steady-state voltage as well as the optimum sinusoidal voltage below the steady-state voltage, and it is enabled to light the discharge lamp with the radiant noise further reduced while minimizing the substantial current limiting element to the utmost extent.

Figure 8:
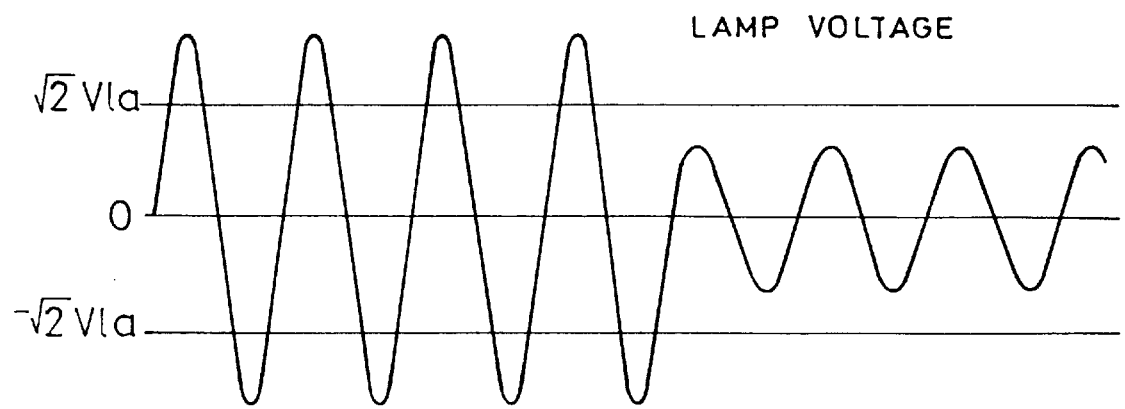
FIGS. 8–13 are operational waveform diagrams of Embodiments 7–12 of the present invention.

An operational waveform diagram of Embodiment 7 of the present invention is shown in FIG. 8, in which the circuit is the same as that in FIG. 7, and a plurality of numbers of the cycles of the sinusoidal voltage exceeding the lamp steady-state voltage Vla or of the sinusoidal voltage below the voltages Vla are taken sequentially. With the change-over number of the sinusoidal voltage sources with respect to the steady-state voltage of lamp for a unit of time reduced, a smooth current control is to be achieved, instead of supplying to the lamp the current of large voltage difference, and the discharge lamp lighting is made possible with the radiant noise more reduced.

Figure 9:
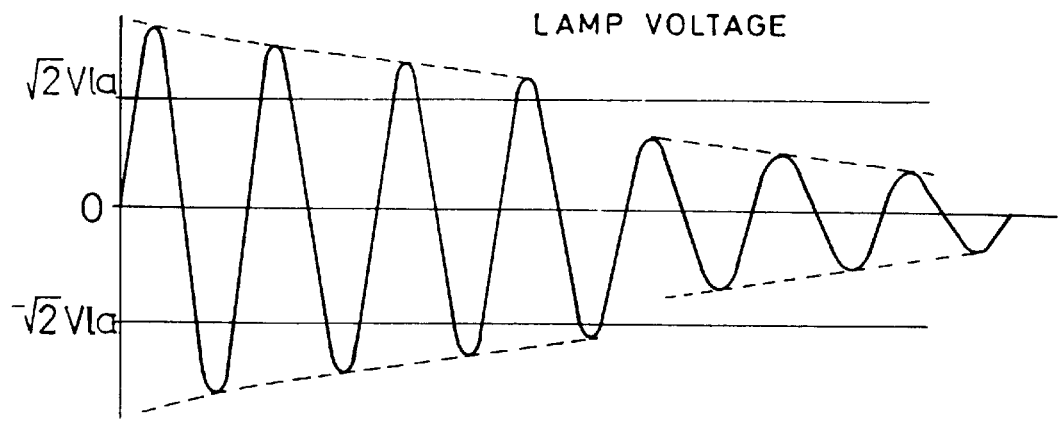

In FIG. 9, an operational waveform diagram of Embodiment 8 of the present invention is shown. The circuit arrangement of this embodiment is the same as that in FIG. 7, in which the number of cycles of the sinusoidal voltage exceeding the lamp steady-state voltage Vla or of the sinusoidal voltage below the voltage Vla is taken sequentially in a plurality, and the amplitude is varied continuously. With the amplitude sequentially varied in this way, it is made possible to carry out the smooth change-over and to realize the discharge lamp lighting with the radiant noise further reduced.

Figure 10:
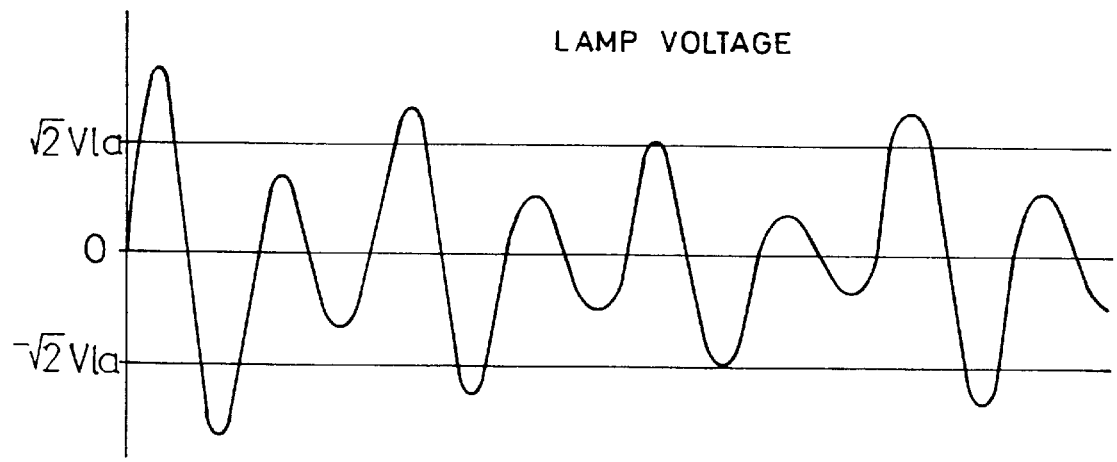

An operational waveform diagram of Embodiment 9 of the present invention is shown in FIG. 10. The circuit arrangement of this embodiment is the same as that in FIG. 7, in which the cycles of the sinusoidal voltage exceeding and below the lamp steady-state voltage Vla are alternately changed over while sequentially varying the amplitude, and it is made possible to carry out the change-over more finely smoothly, and to attain the discharge lamp lighting with more reduced radiant noise.

Figure 11:
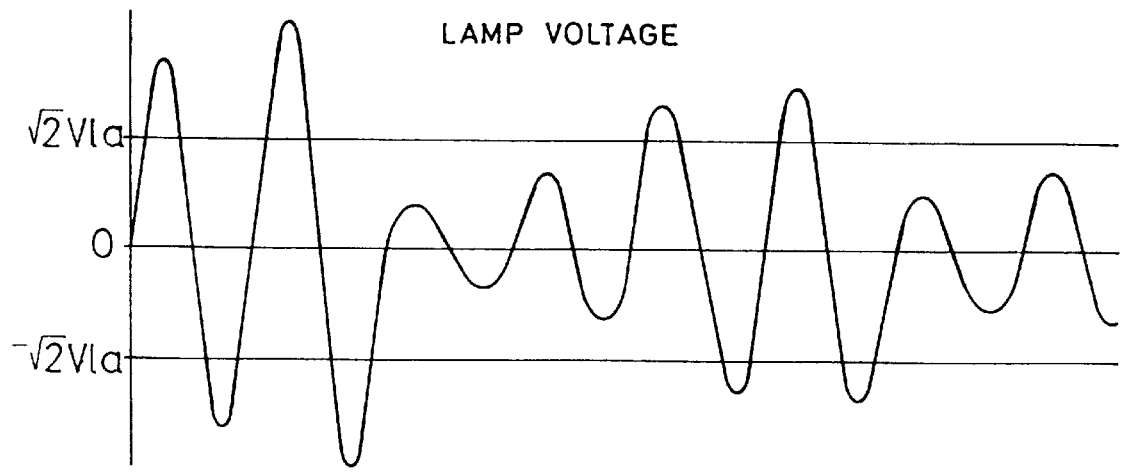

An operational waveform diagram of Embodiment 10 of the present invention is shown in FIG. 11, in which the circuit is the same as FIG. 7 but the number of the cycles and amplitudes of the sinusoidal voltages exceeding and below the lamp steady-state voltage Vla are randomly varied, and it is enabled to improve the controllability in the moment when the cycle of the sinusoidal current is close to the time constant of the increase and decrease in the lamp current and longer.

Figure 12:
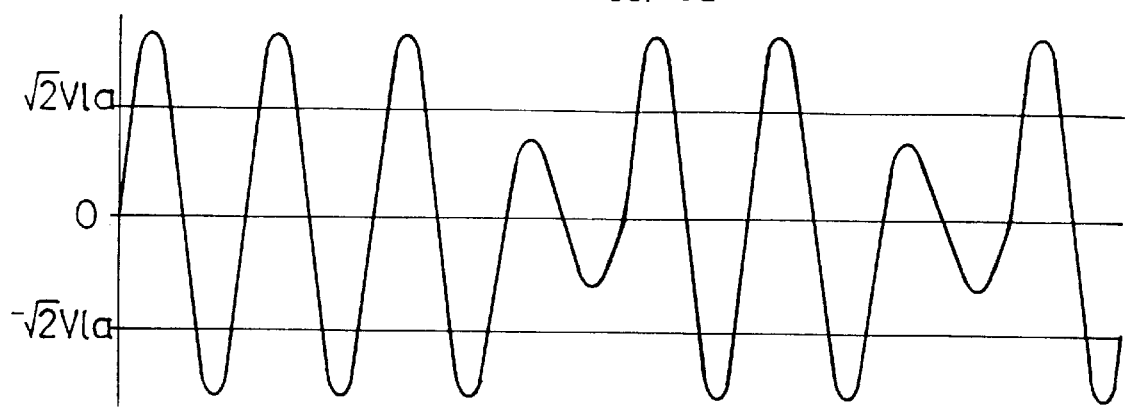

In FIG. 12, an operational waveform diagram of Embodiment 11 of the present invention is shown, which is of the same circuit as FIG. 7, but the number of the cycles of the sinusoidal voltage exceeding the lamp steady-state voltage Vla is controlled, while the number of the cycles of the sinusoidal voltage below the voltage Vla is fixed, whereby it is enabled to simplify the circuit in an event where varying range of the lamp current may be narrow.

Figure 13:
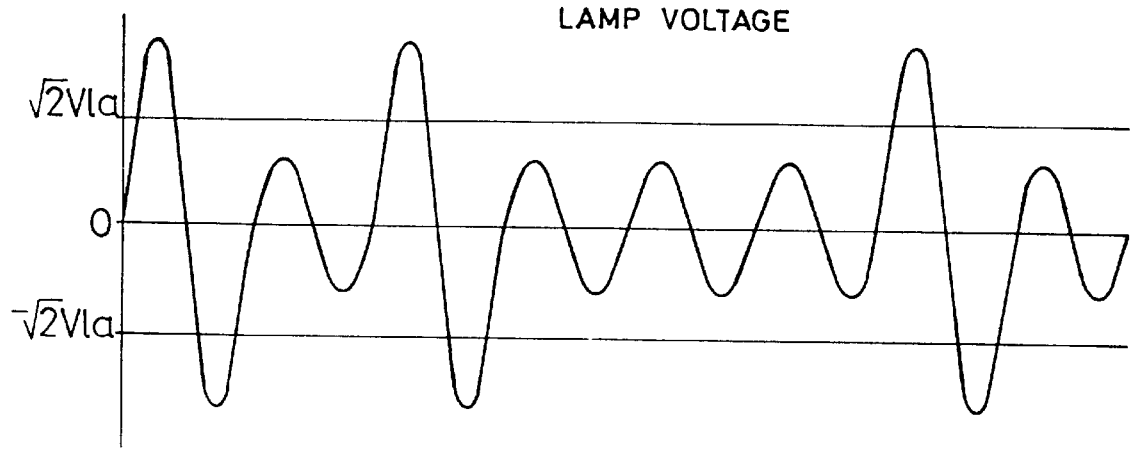

In FIG. 13, an operational waveform diagram of Embodiment 12 of the present invention is shown, in which the circuit is the same as FIG. 7 while the number of the cycles or the amplitude of the sinusoidal voltage below the lamp steady-state voltage Vla is controlled but the number of the cycles of the sinusoidal voltage exceeding the voltage Vla is fixed, whereby the circuit can be simplified in the event when the varying range of the lamp current may be narrow as in the case of FIG. 12.

Figure 14:
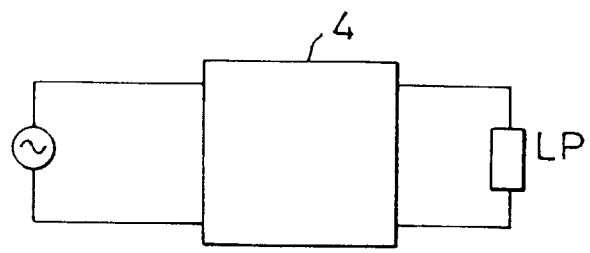
FIG. 14 is a block circuit diagram of Embodiment 13 of the present invention.
Figure 15:
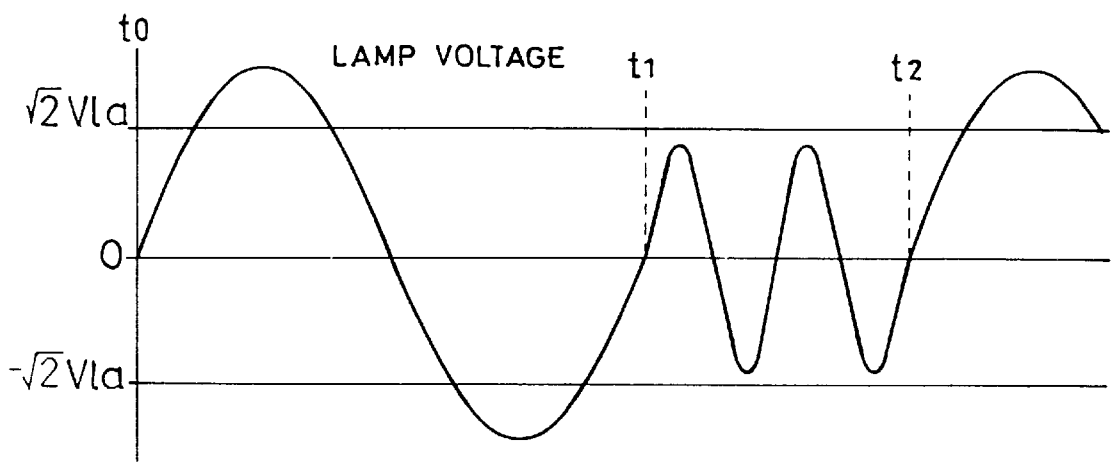
FIG. 15 is an operational waveform diagram of Embodiment 13 shown in FIG. 14.

A circuit diagram and its operational waveform diagram of Embodiment 13 of the present invention are shown in FIGS. 14 and 15 respectively. While the circuit arrangement of this embodiment is a general resonating type inverter circuit, the operation is different from any general circuit. Here, a two-stone current resonance type is referred to as an example. In an inverter for the discharge lamp lighting, an operating frequency of the switching elements is taken to be higher than a self-resonance frequency of a resonance circuit including the load, so that the current waveform of the switching elememt is delayed in the phase, and any switching loss is reduced.

In FIG. 15, the operating frequency of the switching element is made close to the self-resonating frequency in a period from time t0 to time t1 so as to enlarge the resonating energy and to render the energy to the lamp to be large. In a period t1–t2, the operating frequency of the switching element is made far from the self-resonance frequency of the switching element so as to reduce the resonating energy to render the energy to the lamp smaller. When a power is supplied to the lamp alternately with two power sources in the case of the higher frequency and in the case of the lower frequency employed to control the lamp current, there is required no inductance value enough for forming the current limiting element, and a minimization in size of the device is made possible. In the case of a single-stone voltage resonance type inverter, the same control can be made possible by controlling the ON time of the switching element to substantially provide the two voltage sources.

Figure 16:
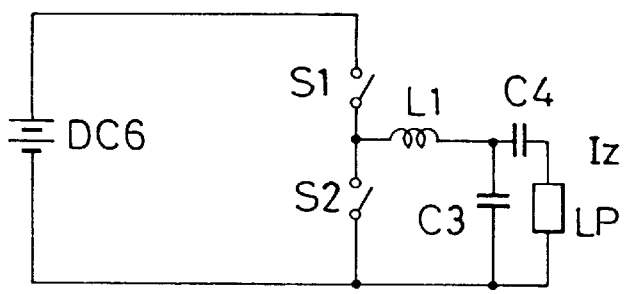
FIG. 16 is a circuit diagram of Embodiment 14 of the present invention.
Figure 17:
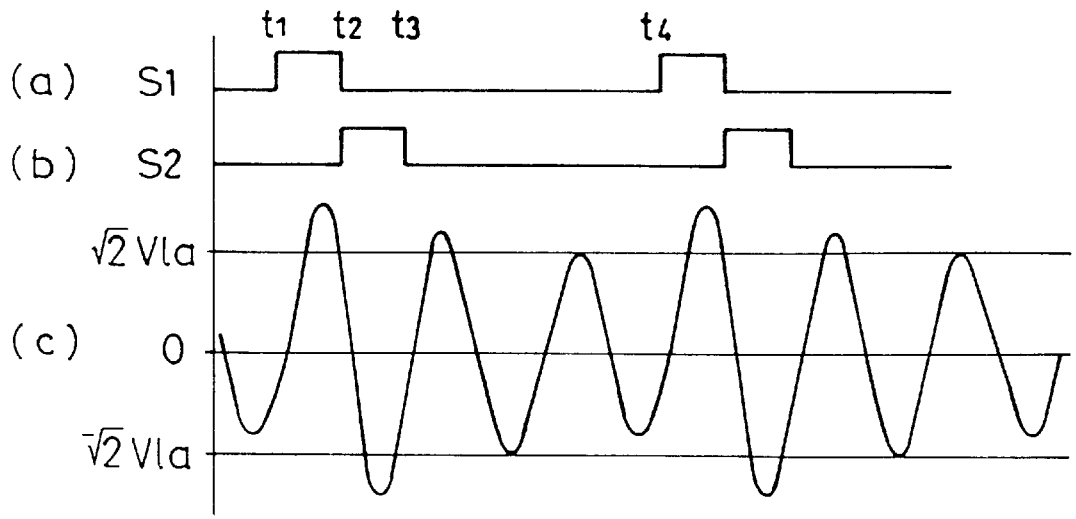
FIG. 17(a,b,c) is an operational waveform diagram of Embodiment 14 shown in FIG. 16.

A circuit diagram and its operational waveform diagram of Embodiment 14 of the present invention are shown in FIGS. 16 and 17 respectively. Here, the two-stone current-resonating type inverter circuit is referred to as an example. To a DC power source DC6, a series circuit of two switch means S1 and S2 is connected, and a series circuit of the inductor L1 and capacitor C3 is connected in parallel to both ends of the switch means S2. Across the capacitor C3, the lamp LP is connected through a capacitor C4. Thus, the circuit arrangement of this embodiment is a general resonating type inverter circuit, but its operation is distinctive from any general one.

As in FIG. 17, the switch means S1 is made ON at time t1, the switch means S1 is turned OFF and the switch means S2 is made ON at time t2, and the switch means S2 turns OFF at time t3, in which event of period t1–t3, the operational frequency is made low to render the resonance energy larger, and the energy to the lamp is enlarged. After time t3, the switch means S1 and S2 are commonly made OFF, and an energy being reduced by a free oscillation of the resonance circuit is supplied to the lamp LP. At time t4, the switch means S1 turns ON again to repeat the above operation, a current thereby caused to attenuatingly oscillate is supplied to the lamp, so that source powers of two different ranges above and below the steady-state voltage of lamp can be supplied to the lamp, and, when the lamp current is controlled, any inductance value as a current limiting element is not required, so as to be able to minimize the device in size.

Figure 18:
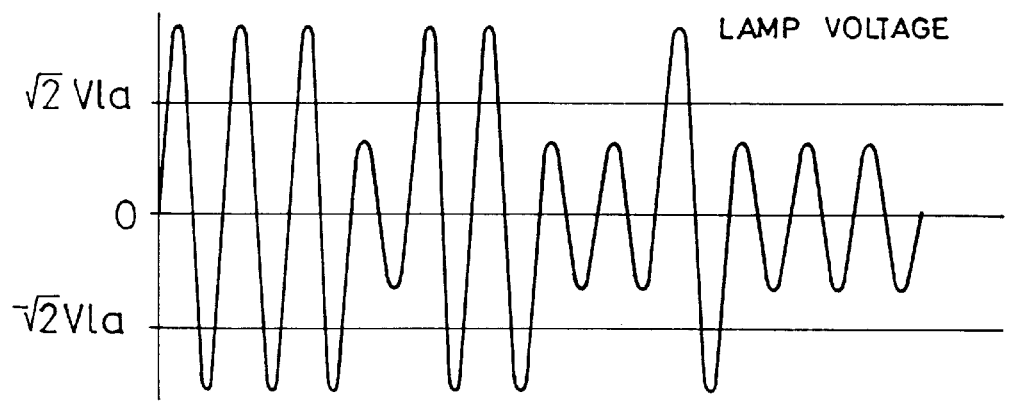
FIG. 18 is an operational waveform diagram of Embodiment 15 of the present invention.

An operational waveform diagram of Embodiment 15 of the present invention is shown in FIG. 18, in which the circuit arrangement is the same as FIG. 7. In varying the lamp current, it is also possible to smoothly vary the lamp current by gradually reducing the number of the connecting cycles of the higher voltage source than the lamp steady-state voltage but gradually increasing the number of the connecting cycles of the lower voltage source than the lamp steady-state voltage, for example, in reducing the lamp current. In this case, it is enabled to attain the discharge lamp lighting with the radiant noise further reduced.

Figure 19:
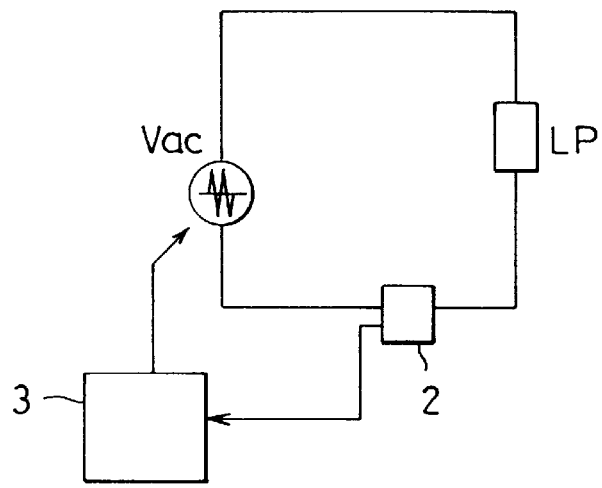
FIG. 19 is a circuit diagram of Embodiment 16 of the present invention.

A circuit diagram of Embodiment 16 of the present invention is shown in FIG. 19. In the circuit arrangement of this embodiment, the foregoing two power sources of variable voltages are replaced by a single AC power source of variable voltage, so that the state of the lamp current is detected by a detecting means, the amplitude of the lamp current is momentarily controlled by controlling the voltage of the AC power source of the variable voltage with an amplitude controlling means in the same manner as has been referred to, and the waveform of the lamp current is made sinusoidal, whereby it is enabled to simplify the circuit arrangement and to attain the discharge lamp lighting with further radiant noise reduced.

Figure 20:
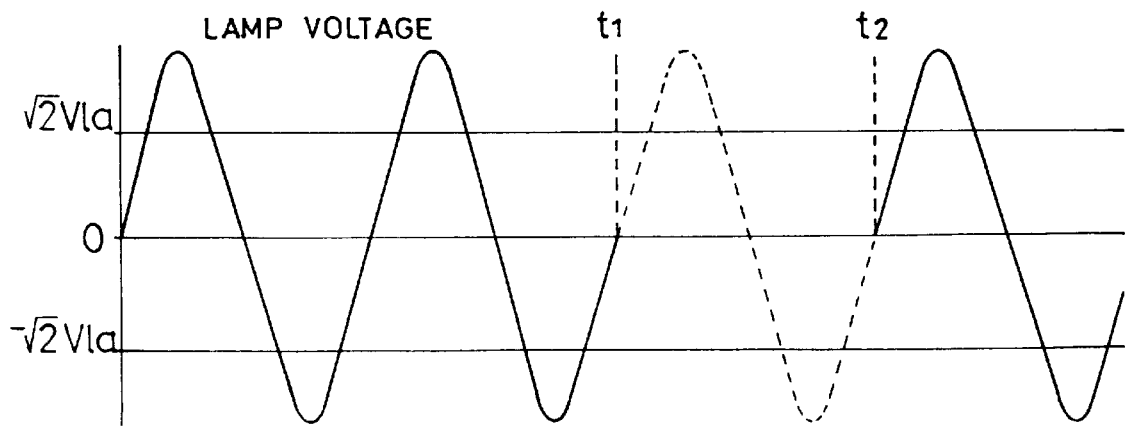
FIGS. 20–24 are operational waveform diagrams of Embodiments 17–21 of the present invention.

In FIG. 20, an operational waveform diagram of Embodiment 17 of the present invention is shown, the circuit of which is the same as FIG. 19, in which the sinusoidal voltage source of the lower voltage than the lamp steady-state voltage Vla is omitted, and the number of cycles of the higher sinusoidal voltage or its amplitude is controlled. In controlling the cycle number, a certain cycle (more than one, for example, the period t1–t2 in the drawing) is deleted for controlling the lamp current. In this case, too, it is enabled to simplify the circuit in the event where the varying range of the lamp current may be narrower.

Figure 21:
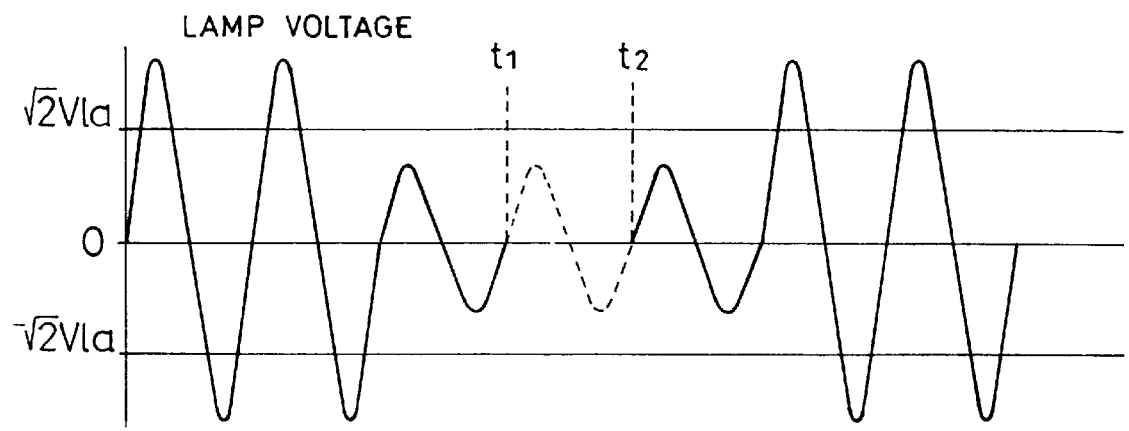

In FIG. 21, an operational waveform diagram of Embodiment 18 of the present invention is shown. The circuit of this embodiment is the same as FIG. 7, in which the voltage sources of sinusoidal voltage exceeding the lamp steady-state voltage Vla as well as sinusoidal voltage below the voltage Vla are employed, and the number of the cycles of these sinusoidal voltages or their amplitude is controlled, while a certain cycle (more than one, for example, a period t1–t2 in the drawing) is deleted in controlling the number of cycles of the voltage below the steady-state voltage of lamp for controlling the lamp current. In this case, too, it is made possible to simplify the circuit in the event where the range of the lamp current variation may be narrow.

Figure 22:
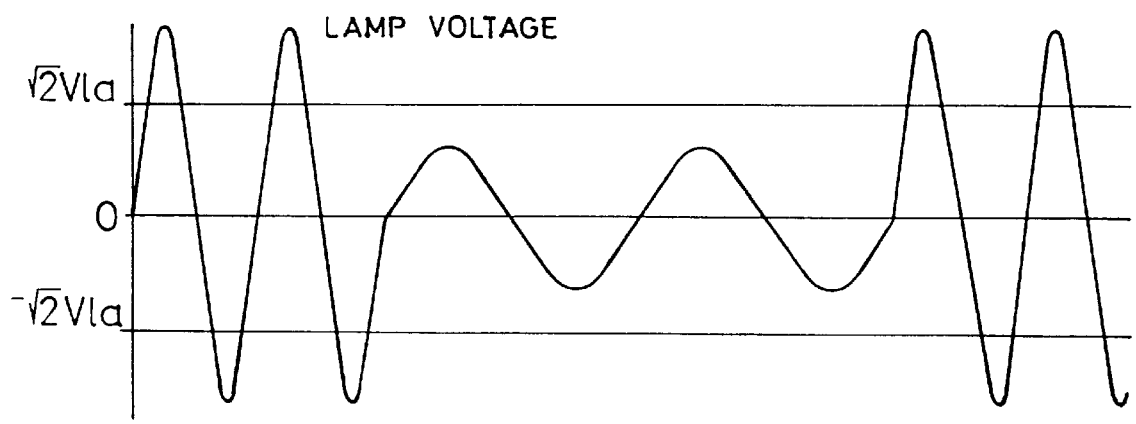

An operational waveform diagram of Embodiment 19 of the present invention is shown in FIG. 22. The circuit of this embodiment is the same as FIG. 7, in which the sources of the sinusoidal voltage exceeding the lamp steady-state voltage Vla as well as the sinusoidal voltage below the voltage Vla are employed, the number of cycles of the sinusoidal voltage or its amplitude is controlled, and the frequency of the voltage exceeding the lamp steady-state voltage is made higher than the frequency of the voltage below the lamp steady-state voltage. According to this embodiment, it is possible to provide a circuit which is stable, easy to control or of simple structure, in the case where the source voltage below the lamp steady-state voltage is closer to the lamp steady-state voltage than the source voltage exceeding the lamp steady-state voltage.

Figure 23:
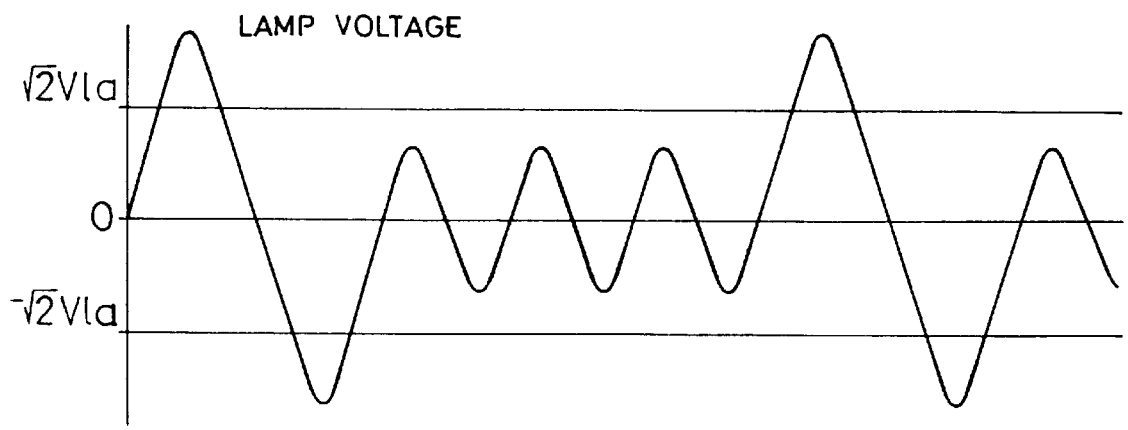

Operational waveform diagram of Embodiment 20 of the present invention is shown in FIG. 23, in which the circuit is the same as FIG. 7, the voltage sources of the sinusoidal voltage exceeding the lamp steady-state voltage Vla as well as the sinusoidal voltage below the voltage Vla are employed, the number of the cycles or the amplitude of the sinusoidal voltage is controlled, and further the frequency of the source voltage exceeding the lamp steady-state voltage is made lower than the frequency of the source voltage below the lamp steady-state voltage. In this embodiment, it is possible to provide a circuit of a stable operation with a simpler control or of a simpler structure in an event when the source voltage exceeding the lamp steady-state voltage Vla is closer to this voltage Vla than the source voltage below the voltage Vla.

Figure 24:
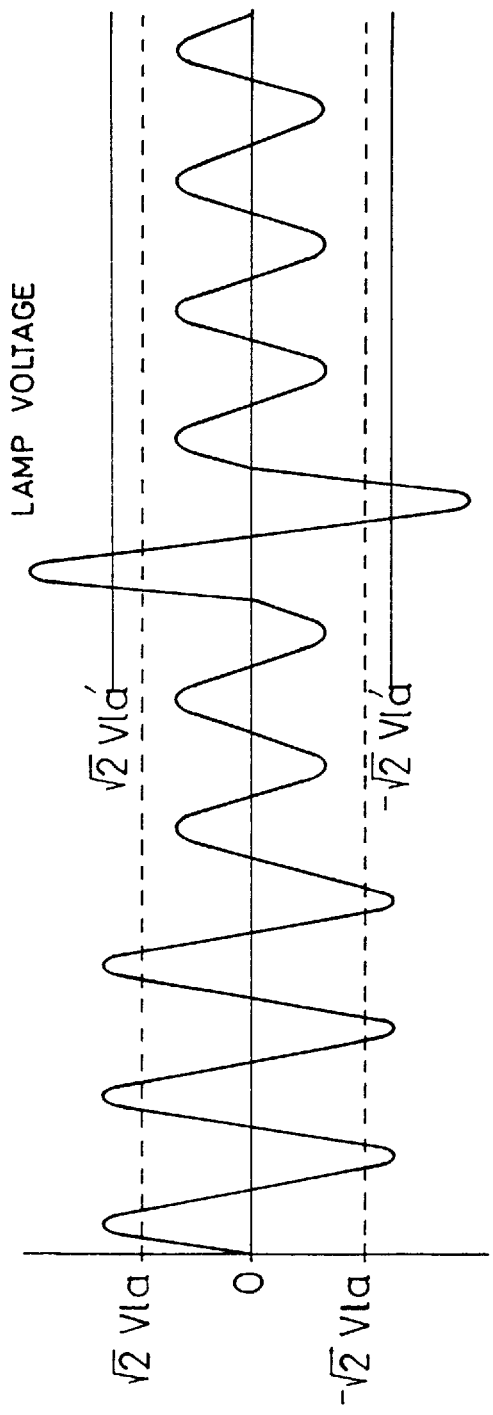

An operational waveform diagram of Embodiment 21 of the present invention is shown in FIG. 24, in which the circuit is the same as FIG. 7, the voltage sources of the sinusoidal voltage exceeding the lamp steady-state voltage Vla and of the sinusoidal voltage below this voltage Vla are employed, the number of cycles or the amplitude of the sinusoidal voltages is controlled, and, upon dimming operation, the control is executed so that, at least as the dimming rate increases, the source voltage exceeding the lamp steady-state voltage is controlled to be higher in the amplitude but to be less in the number of cycles. This operation of the present embodiment will be measures taken against that, upon the dimming, the lamp steady-state voltage are gradually elevated from Vla to Vla, and enables to provide a device of more stable operation.

Figure 25:
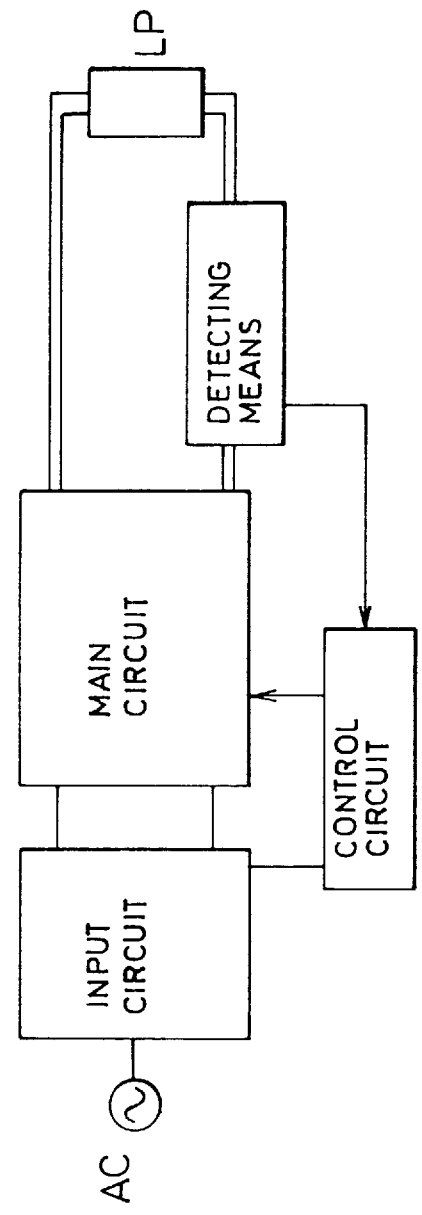
FIG. 25 is a block circuit diagram of Embodiment 22 of the present invention.
Figure 26:
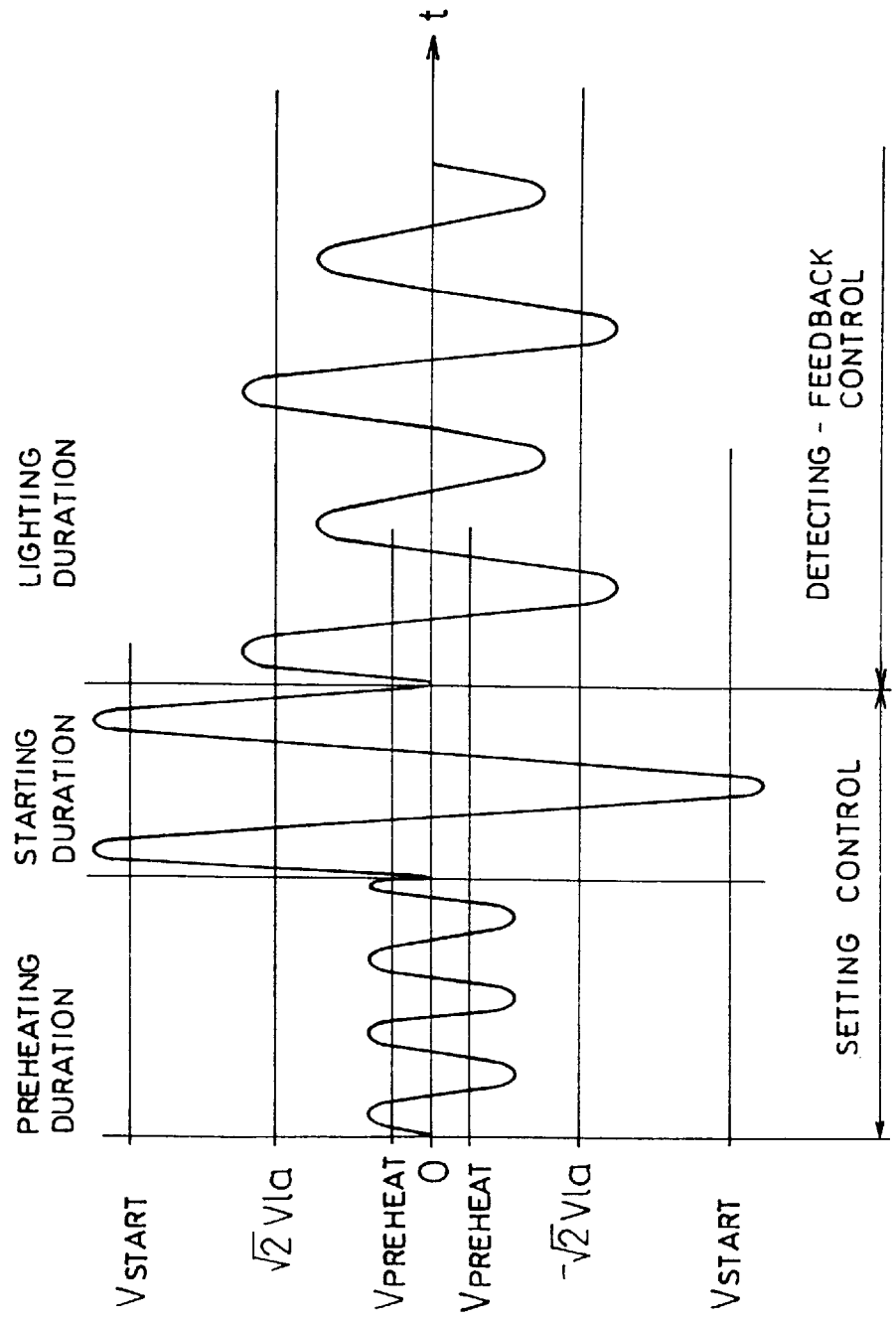
FIG. 26 is an explanatory view for the operation of Embodiment 22 shown in FIG. 25.

A block circuit diagram and its operational waveform diagram of Embodiment 22 of the present invention are shown respectively in FIGS. 25 and 26. In the circuit of this embodiment, an energy is supplied to the lamp from an AC power source through an input protecting circuit or an input circuit having a filter and through a main circuit having such arrangement as shown, for example, in FIG. 4. A detecting means is disposed between the main circuit and a lamp LP for detecting the current or the like to the lamp LP for a feedback to a control circuit to perform the control.

In the present embodiment, as seen in FIG. 26, a set preheating current is supplied to the lamp filaments for preheating, a set voltage is supplied across the lamp upon starting the same, and the lamp is started through the preheating and reaches the lighting.

After this, the main circuit is controlled by a detection signal from the detecting means and the voltage above and below the voltage Vla are supplied to the lamp, in accordance with the lamp steady-state voltage. Upon the preheating and starting, the control in accordance with the lamp steady-state voltage is not required, so that the control circuit can be simplified when made operable without any feedback control, and an economical circuit can be provided.

Figure 27:
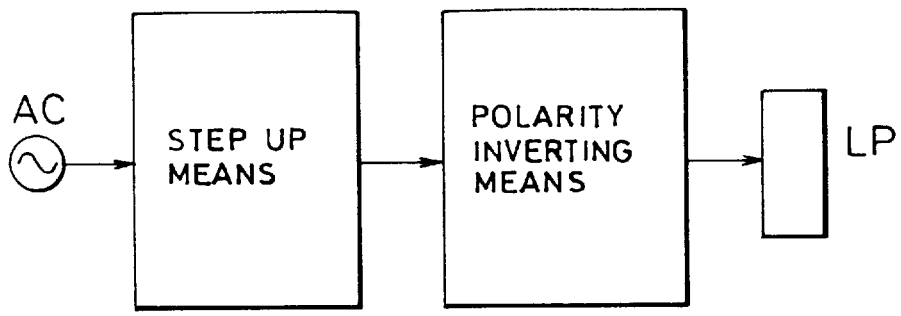
FIG. 27 is a block circuit diagram of Embodiment 23 of the present invention.
Figure 28:
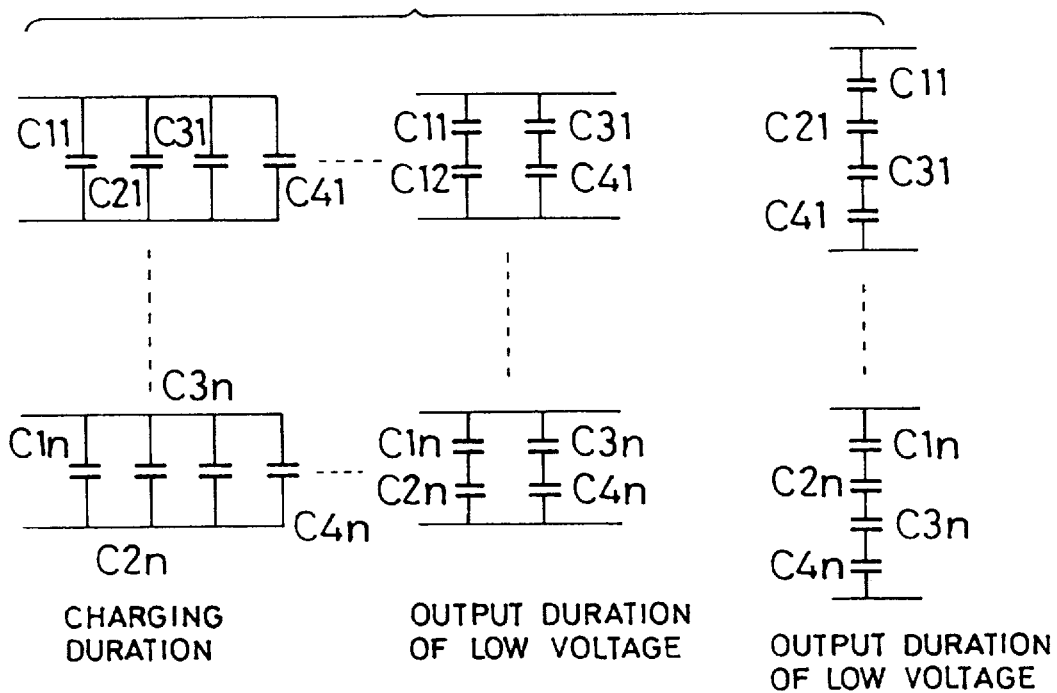
FIG. 28 is a fragmentary circuit diagram of Embodiment 23 shown in FIG. 27.
Figure 29:
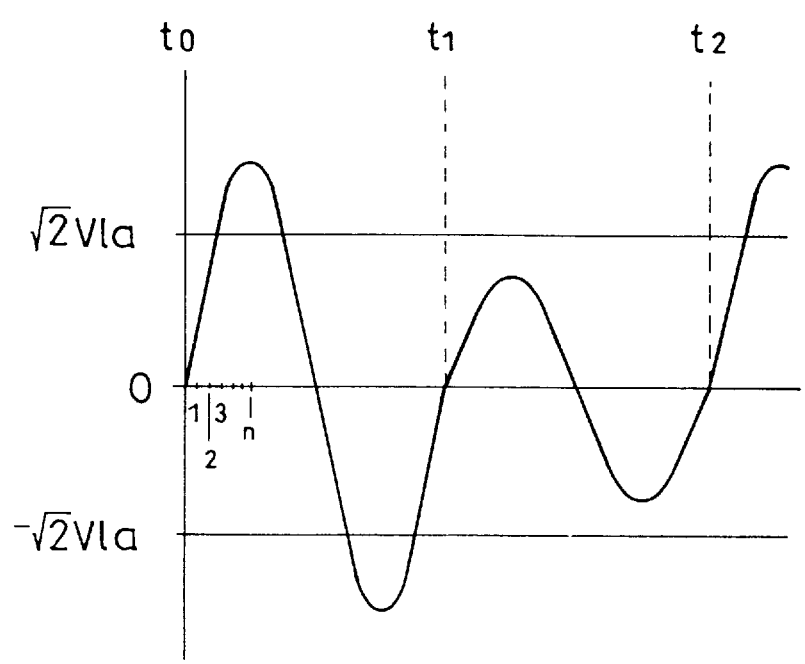
FIG. 29 is an operational waveform diagram of Embodiment 23 shown in FIG. 27.

A block circuit diagram, its operation explanatory view and its operational waveform diagram of Embodiment 23 of the present invention are shown in FIGS. 27, 28 and 29 respectively. In this embodiment, capacitors are connected in parallel to be charged by the AC power source but are connected in series for discharging, and means for inverting the polarity is provided for a conversion to alternating current (see FIG. 27). As shown in FIG. 28, a boosting means for the parallel charge and series discharge is provided in a plurality (from 1 to n), which are provided for changeable connection in accordance with the input voltage so as to be able to improve any distortion in the input current. Upon outputting, too, outputs are sequentially provided, so that the outputting at optional frequency can be made.

The foregoing respective boosting means can output voltages in two different states of high voltage outputting and low voltage outputting and also can provide an optional boosting ratio by varying the connecting number of the capacitors upon the charging and upon the discharging, so that the means can cope with two AC voltages of top and bottom values of such varying steady-state voltage Vla as shown in FIG. 29. In this case, too, it is made possible to realize the discharge lamp lighting device causing less noise, by the connection of the sinusoidal AC voltage sources.

Figure 30:
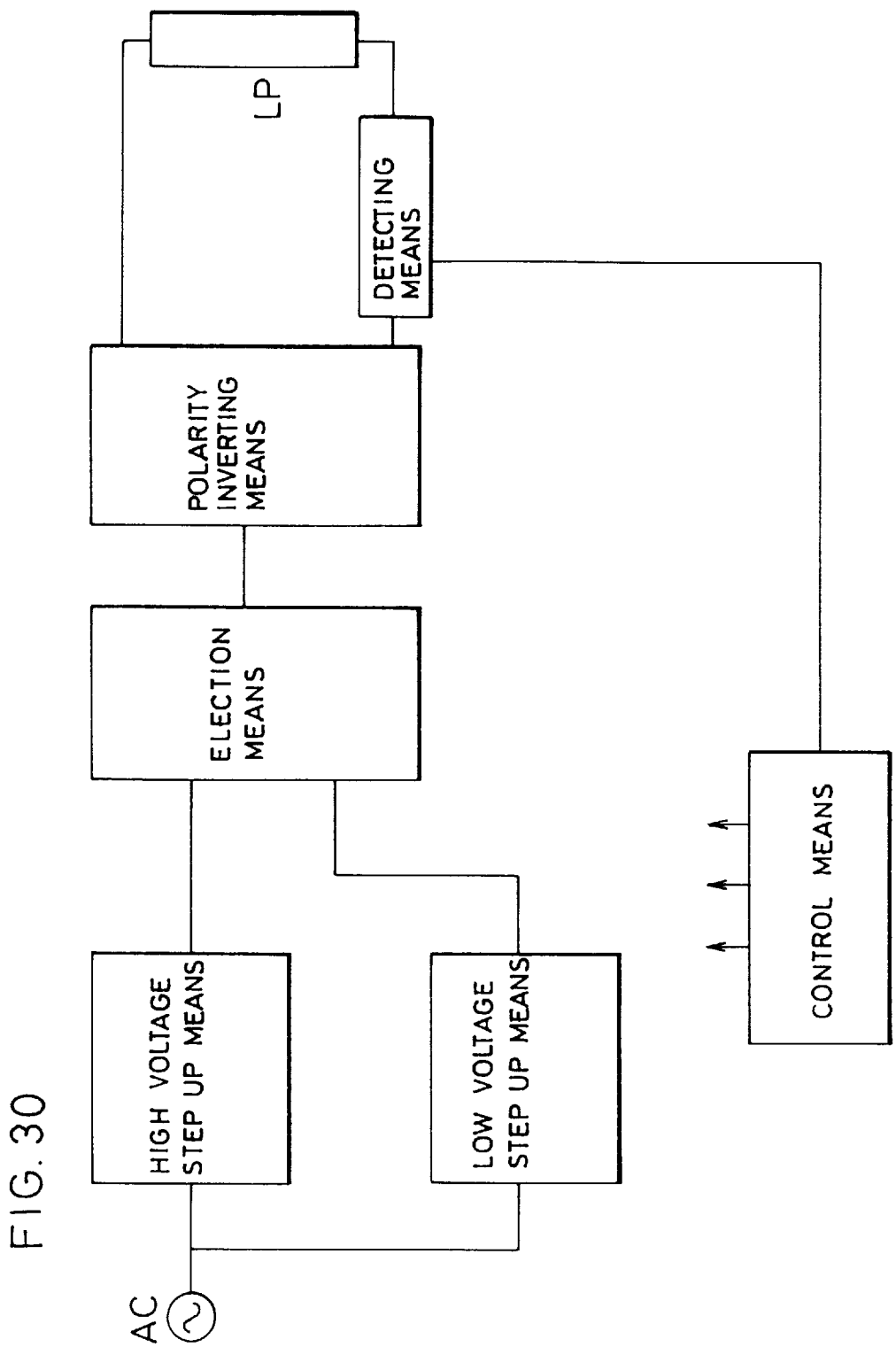
FIG. 30 is a block circuit diagram of Embodiment 24 of the present invention.

Embodiment 24 of the present invention is shown in FIG. 30, in which the boosting means of Embodiment 23 is comprised of two of the means, one for the high voltage and the other for the low voltage. The operation will be the same as the foregoing embodiment of FIG. 27, so that the voltages higher and lower than the lamp steady-state voltage will be selected at a selection circuit, and the selected voltage will be provided to a polarity inverting circuit to be supplied to the lamp.

In this case, too, a plurality (from 1 to n) of the boosting means for the parallel charging and series discharging are provided, of which connection is changed over in accordance with input voltage so as to be able to improve any distortion in the input current, it is possible to provide outputs at any optional frequency, any optional boosting ratio can be obtained by varying the connecting number of the capacitors at the charging and discharging, and it is enabled to cope with the two AC voltages of the above and below values of the varying voltage Vla. In this case, too, it is possible to attain the discharge lamp lighting device of less noise by connecting the sinusoidal AC voltage sources.

Figure 31:
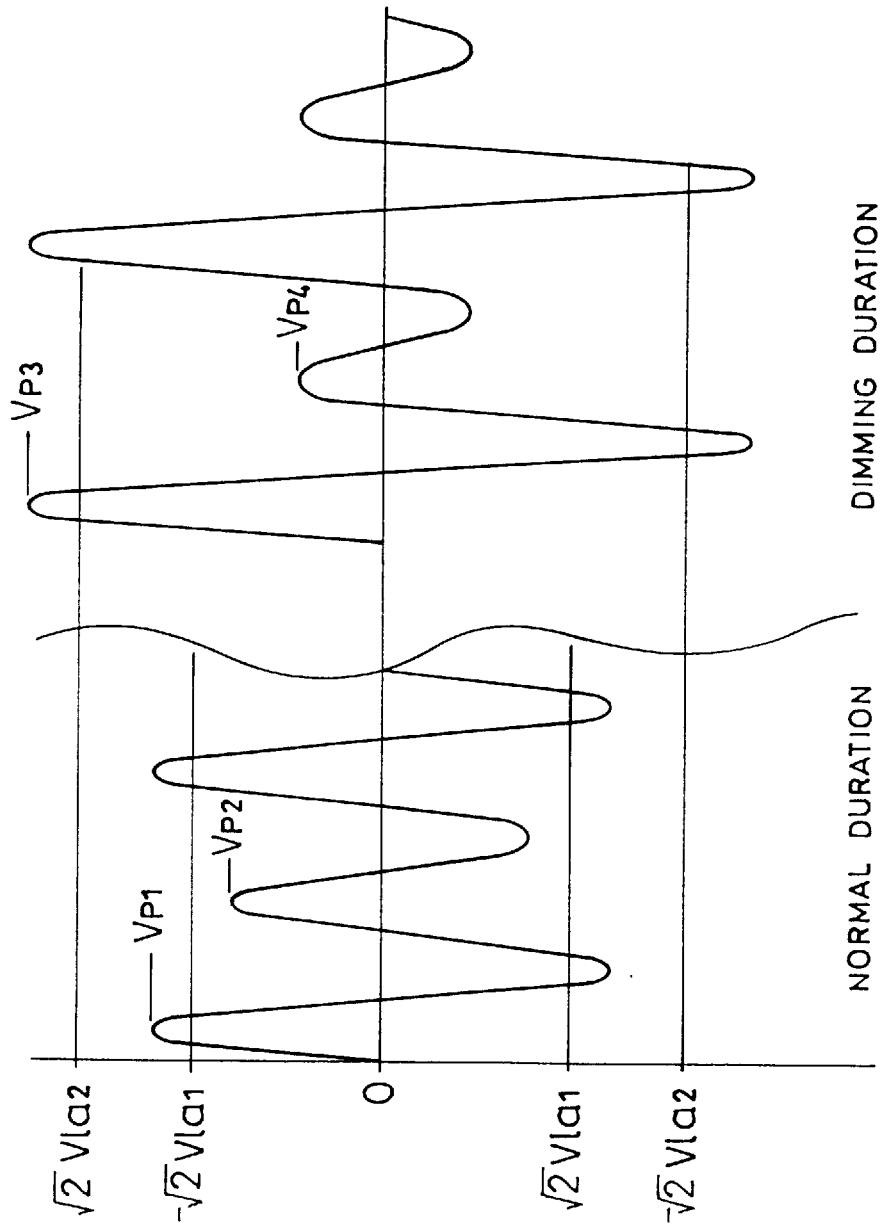
FIG. 31 is an operational waveform diagram of Embodiment 25 of the present invention.

In FIG. 31, an operational waveform diagram of Embodiment 25 of the present invention is shown, in which, in contrast to Embodiment 21, the arrangement is such that, upon the dimming, the output voltage is controlled to render the higher voltage than the steady-state voltage of lamp to be further higher and the lower voltage than the steady-state voltage to be further lower. With this arrangement, required energy for the entire device can be reduced while coping with the rise in the lamp voltage, and the dimming of a wider range can be performed.

Figure 32:
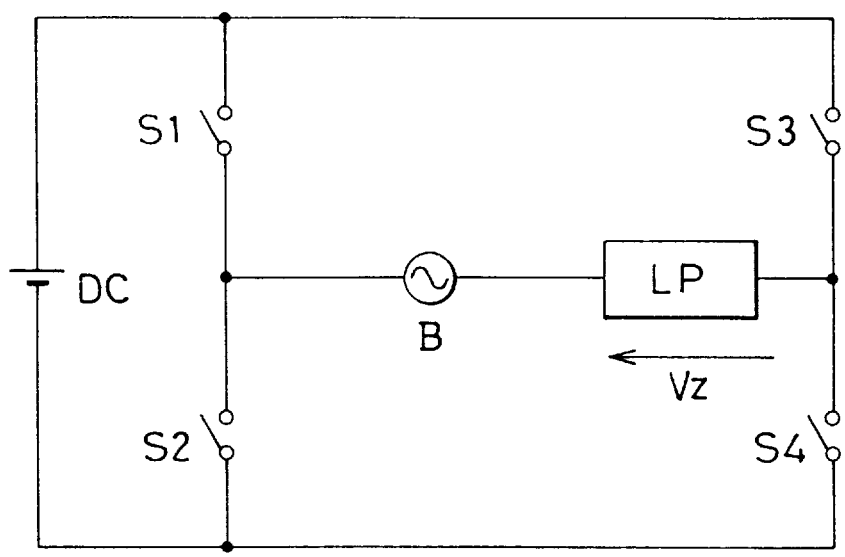
FIG. 32 is a circuit diagram of Embodiment 26 of the present invention.
Figure 33:
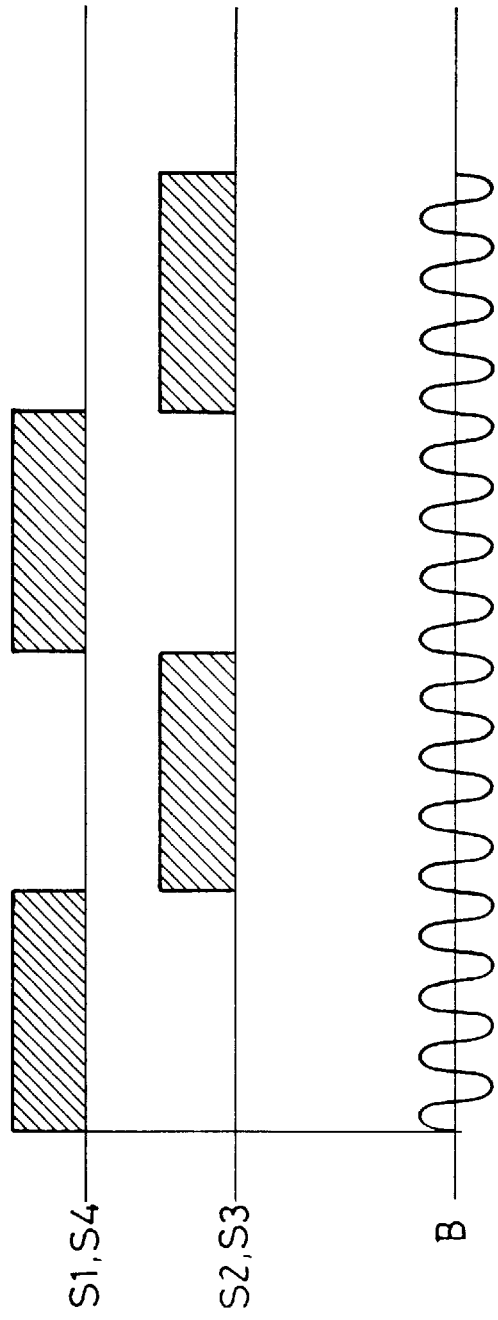
FIGS. 33 and 34 are operational waveform diagram of Embodiment 26 shown in FIG. 32.
Figure 34:
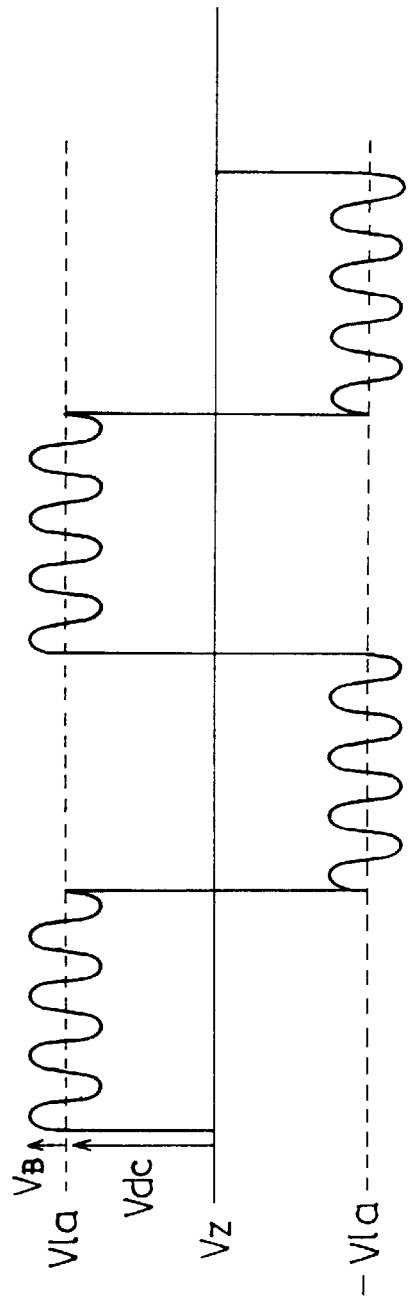

A circuit diagram of Embodiment 26 of the present invention is shown in FIG. 32, and its operational waveform diagrams are shown in FIGS. 33 and 34, in which a high frequency AC voltage source B (of an amplitude VB) and a discharge lamp LP are connected in series to a DC power source DC through such DC/AC convertion circuit as a full-bridge circuit of switching elements S1–S4 or the like. When the source DC has a voltage close to the lamp steady-state voltage Vla and the AC source voltage of the high frequency AC voltage source B is in the same polarity as the DC source voltage, therefore, a voltage Vdc+VB (>Vla) is applied to the lamp, and the lamp is apt to be in a runaway state. When the AC source voltage of the source B is in inverse porality to the DC source voltage, a voltage Vdc−VB (<Vla) is applied to the lamp, and the lamp is about to be extinguished. Here, by setting the cycle of the amplitude VB of the AC source voltage to be shorter than the time constant of the lamp, it is possible to perform two value control of the lamp voltage. In the present embodiment, a basic frequency of the alternating current for lighting the lamp can be set independently of the time constant of the two value control by means of the time constant of the lamp.

Figure 35:
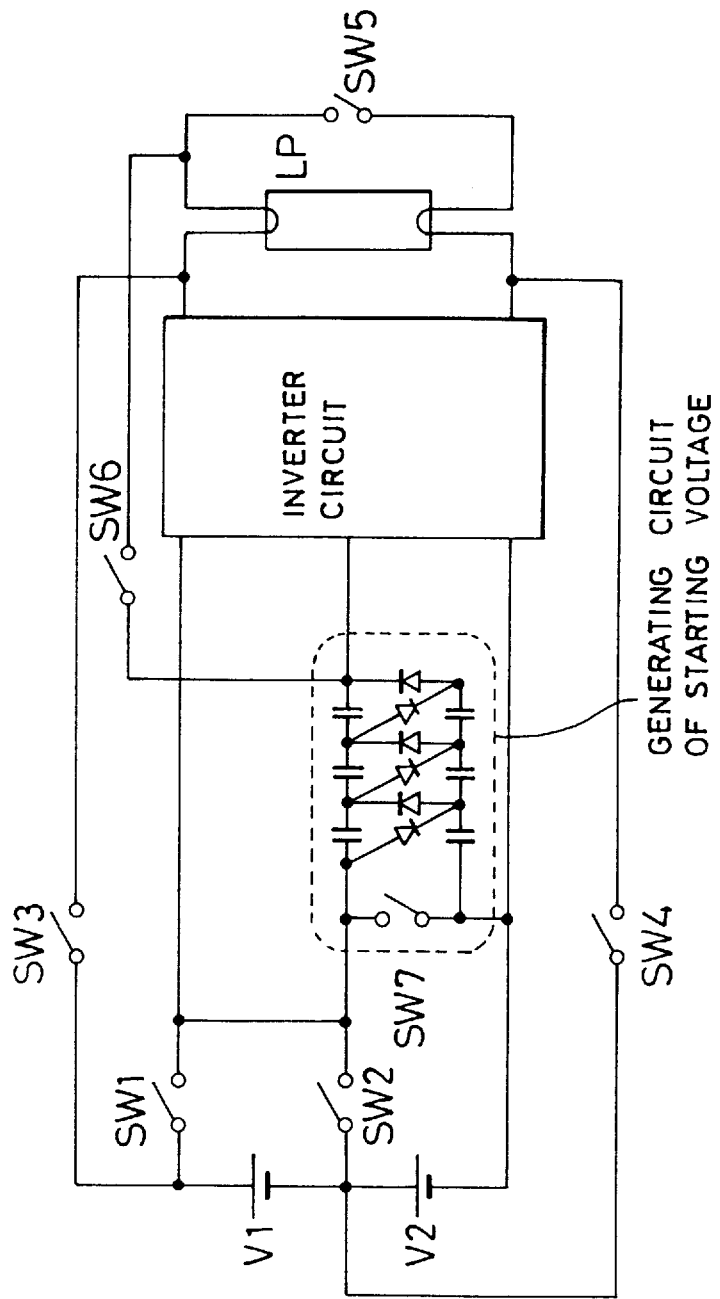
FIG. 35 is a circuit diagram of Embodiment 27 of the present invention.

In FIG. 35, Embodiment 27 of the present invention is shown, in which two of the voltage sources for the inverter circuit are connected in series, one of which has the lower voltage (V2) than the lamp steady-state voltage while the other has a differential voltage (V1) between the higher and lower voltages than the lamp steady-state voltage, the arrangement being such that the two voltages for stably lighting the lamp are obtained through a change-over of the switching elements Sw1 and Sw2, and the preheating and starting of the lamp can be realized in smooth manner. Normally, the two voltages are close to the lamp steady-state voltage, and are V1<<V2. In the present embodiment, further, a Cockcroft circuit is employed as a starting voltage generating circuit.

Now, a preheating of the lamp filaments are carried out by turning the switching elements Sw3–Sw5 ON from OFF state of all switching elements. At the same time, a charging of the Cockcroft circuit is carried out by changing over the switching elements Sw3 and Sw7. Upon completion of the charging of the Cockcroft circuit and of the preheating of the lamp filaments, the switching elements Sw1–Sw5 and Sw7 are turned OFF and the switching elements Sw2 and Sw6 are turned ON to apply the starting voltage to the lamp LP, and the lamp is lighted. As the lamp shifts to normal lighting state, the lamp is stably lighted by changing over the switching elements Sw1 and Sw2. In this manner, according to the present embodiment, the preheating and starting circuits for the lamp are shown, in which the lower voltage source is employed for the filament preheating to restrain the current value, while the higher voltage source is employed for generating the starting voltage.

Figure 36:
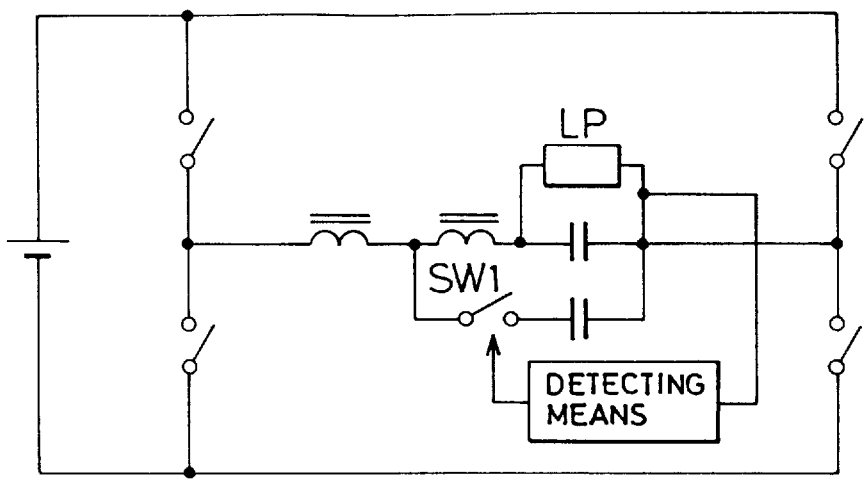
FIG. 36 is a circuit diagram of Embodiment 28 of the present invention.
Figure 37:
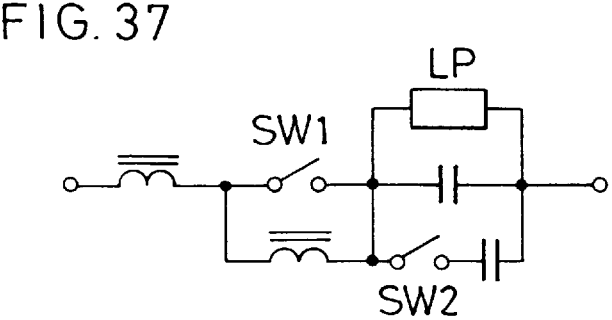
FIG. 37 is a fragmentary circuit diagram of Embodiment 28 of FIG. 36.

Embodiment 28 of the present invention is shown in FIGS. 36 and 37, in which it is attempted to stably light the discharge lamp by varying the time constant of resonance in such load circuit as the inverter circuit, to have the applied voltage to the lamp varied. In this case, the inverter circuit of a full-bridge arrangement is employed so that the lamp current is detected during the normal lighting of the lamp, and the stable lamp lighting is attempted by turning ON and OFF the switching element Sw1 in an aspect of FIG. 36, in accordance with the increment and decrement in the lamp current. In another aspect of FIG. 37, the same effect as in the foregoing embodiments can be attained by turning the switching element Sw1 ON and OFF and the switching elements Sw2 OFF and ON.

What is claimed is:

1. A stable discharge lamp lighting device comprising:
   a discharge lamp, and
   a power source means for outputting AC voltage components containing a higher voltage value and a lower voltage value than a steady-state voltage of the discharge lamp for a stable lighting thereof, the AC voltage components of the higher voltage value and of the lower voltage value being respectively variable in instantaneous value along a continuum in each cycle comprising both higher and lower voltage value components.

2. The device according to claim 1 wherein said power source means comprises first AC power source having the higher voltage value than the steady-state voltage of the lamp, the instantaneous values of said higher voltage value varying continuously, second AC power source having the lower voltage value than the steady-state voltage of the lamp, the instantaneous values of said lower voltage value varying continuously, and means for changing over connection of said first and second AC power sources to the lamp at zero-cross points in each cycle for the stable lighting of the lamp.

3. The device according to claim 2 wherein said power source means is arranged for controlling a lamp current with an amplitude of voltage waveform varied in each cycle.

4. The device according to claim 3 wherein said first AC power source has a voltage cycle which varies substantially in said amplitude of voltage waveform in each cycle, and said second AC power source has a voltage cycle which varies substantially sinusoidally in said amplitude of voltage waveform in each cycle.

5. The device according to claim 4 wherein said power source means is arranged for controlling said lamp current with said camp current with said amplitude of voltage waveform at more than 1 kHz.

6. The device according to claim 4 wherein said power source means is arranged for a smooth control of said lamp current with said amplitude of voltage waveform continuously varied in each cycle.

7. The device according to claim 4 wherein said first and second AC power sources respectively have a plurality of cycles.

8. The device according to claim 4 wherein said power source means is arranged for alternately changing over connection of said first and second AC power sources to said discharge lamp.

9. The device according to claim 4 wherein said power source means is arranged for randomly changing over connection of said first and second AC power sources to said discharge lamp.

10. The device according to claim 4 wherein said power source means is arranged to keep said cycle of at least one of said first and second AC power sources to be constant.

11. The device according to claim 4 wherein said power source means is arranged to gradually increase the number of said cycle of one of said first and second AC power sources and to gradually decrease the number of said cycle of the other of the first and second AC power sources.

12. The device according to claim 4 wherein said power source means is arranged to omit at least one of said first and second AC power sources from the connection to the lamp in each cycle.

13. The device according to claim 4 wherein said power source means is arranged to employ mutually different frequencies for said first and second AC power sources.

14. A stable discharge lamp lighting device comprising:
a discharge lamp,
a power source means including first AC power source of a higher voltage value than a steady-state voltage of the discharge lamp for a stable lighting thereof and second AC power source of a lower voltage value than the steady-state voltage of the discharge lamp for a stable lighting thereof, and
means for changing over connection of the first and second AC power sources to the discharge lamp at zero-cross points in each cycle as a unit for the stable lamp lighting,
the first and second AC power sources being arranged respectively for controlling a current to the discharge lamp with a substantially sinusoidally varying amplitude of voltage waveform in each cycle as a unit, the higher and lower voltage values of the first and second AC power sources being thus respectively varied in the instantaneous value of the voltage in continuous manner in each cycle, wherein said power source means is arranged to elevate voltage peak value of said first AC power source and to reduce the number of cycles of said first AC power source as a dimming state advances.

15. The device according to claim 4 wherein said power source means is arranged to elevate voltage peak value of said first AC power source and to reduce the number of the cycles of said first AC power source upon starting said lamp as compared with stably lighting said lamp.

16. The device according to claim 14 wherein said power source means is arranged to lower voltage peak value of said second AC power source.

17. The device according to claim 15 wherein said power source means is arranged to lower voltage peak value of said second AC power source.

18. The device according to claim 2 wherein said power source means supplies to said discharge lamp a voltage of a set amplitude upon preheating and starting the lamp, and further comprises a detection circuit for detecting a lamp current upon lighting the lamp, a detection of which detection circuit being used for a feedback control for a stable lighting.

19. The device according to claim 2 wherein said power source means further comprises said first AC power source having first boosting circuit comprising a switched capacitor and first polarity inverting circuit for inverting the polarity of an output of said first boosting circuit, and said second AC power source having second boosting circuit comprising a switched capacitor and second polarity inverting circuit for inverting the polarity of an output of said second boosting circuit.

20. The device according to claim 1 wherein said power source means is arranged to superpose an AC voltage of a substantially rectangular waveform on said AC voltage components, to provide an output for stably lighting the lamp.

21. The device according to claim 1 wherein said power source means is arranged to employ one of divided voltages of said AC voltage components of the lamp for starting the lamp, and the other voltage for preheating filaments of the lamp.

22. A stable discharge lamp lighting device comprising:
a discharge lamp;
first AC power source of a higher voltage value than a steady-state voltage of the discharge lamp for a stable lighting thereof;
second AC power source of a lower voltage value than the steady-state voltage of the discharge lamp for a stable lighting thereof; and
means for changing over connection of the first and second AC power sources to the discharge lamp at zero-cross points in each cycle for the stable lamp lighting,
the first and second AC power sources being arranged respectively for controlling a current to the discharge lamp with a substantially sinusoidally varying amplitude of voltage waveform in each cycle, the higher and lower voltage values of the first and second AC power sources respectively being thus varied, independently of each other, wherein an instantaneous value of the voltage varies in a continuous manner in each cycle.

23. A stable discharge lamp lighting device comprising:
a discharge lamp;
first AC power source of a higher voltage value than a steady-state voltage of the discharge lamp for a stable lighting thereof;
second AC power source of a lower voltage value than the steady-state voltage of the discharge lamp for the stable lighting thereof; and
means for changing over connection of the first and second AC power sources to the discharge lamp at zero-cross points in each cycle as a unit for the stable lamp lighting, the first and second AC power sources being arranged respectively for controlling a current to the discharge lamp with a continuously varying amplitude of voltage waveform in each cycle, the higher and lower voltage values of the first and second AC power sources respectively being varied, independently of each other, wherein an instantaneous value of the voltage varies in a continuous manner in each cycle.

* * * * *